(12) United States Patent
Nishikawa et al.

(10) Patent No.: US 8,751,657 B2
(45) Date of Patent: Jun. 10, 2014

(54) MULTI-CLIENT STORAGE SYSTEM AND STORAGE SYSTEM MANAGEMENT METHOD

(75) Inventors: Norifumi Nishikawa, Machida (JP); Hirokazu Ikeda, Yamato (JP); Masaaki Iwasaki, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 106 days.

(21) Appl. No.: 13/264,180

(22) PCT Filed: Oct. 4, 2011

(86) PCT No.: PCT/JP2011/005591
§ 371 (c)(1),
(2), (4) Date: Oct. 13, 2011

(87) PCT Pub. No.: WO2013/051056
PCT Pub. Date: Apr. 11, 2013

(65) Prior Publication Data
US 2013/0086270 A1 Apr. 4, 2013

(51) Int. Cl.
*G06F 15/173* (2006.01)
(52) U.S. Cl.
USPC .............. 709/226; 709/203; 709/229
(58) Field of Classification Search
USPC .......... 709/223, 224, 225, 226, 227, 228, 229
See application file for complete search history.

(56) References Cited

U.S. PATENT DOCUMENTS

| 7,961,594 B2 * | 6/2011 | Alon et al. ................... 370/216 |
| 2004/0025162 A1 | 2/2004 | Fisk |
| 2006/0129771 A1 | 6/2006 | Dasgupta et al. |
| 2006/0155944 A1 * | 7/2006 | Kano ............................. 711/161 |
| 2008/0177947 A1 * | 7/2008 | Eguchi et al. ................. 711/114 |
| 2008/0271039 A1 | 10/2008 | Rolia et al. |
| 2011/0099403 A1 | 4/2011 | Miyata et al. |
| 2011/0246652 A1 * | 10/2011 | Tabbara et al. ............... 709/226 |

FOREIGN PATENT DOCUMENTS

| JP | H07-141270 A | 6/1995 |
| JP | 2008176627 A | 7/2008 |
| JP | 2011090594 A | 5/2011 |

* cited by examiner

*Primary Examiner* — Dhairya A Patel
(74) *Attorney, Agent, or Firm* — Volpe And Koenig, P.C.

(57) ABSTRACT

An aspect of the invention is a multi-client storage system comprising a management computer including a processor and a memory, for allocating resources of a plurality of storage apparatus to a plurality of clients, the management computer comprising: a receiving unit for receiving conditions for a client to which a new resource is to be allocated; a determining unit for determining whether the new resource is securable under the received conditions without changing resources allocated to existing clients and conditions for the volumes for each of the existing clients; and an allocation unit for securing, when it is determined that the new resource is securable under the received conditions, the new resource under the received conditions for the client in the plurality of storage apparatus and allocating the new resource to the client.

6 Claims, 21 Drawing Sheets

| 525 | 526 | 527 |
|---|---|---|
| STORAGE APPARATUS | PORT | BANDWIDTH |
| 1 | 11 | 4Gbps |
| 1 | 12 | 4Gbps |
| 2 | 21 | 4Gbps |
| 2 | 22 | 4Gbps |

520 PORT MANAGEMENT TABLE

*Fig.6*

| 531 | 532 | 533 |
|---|---|---|
| STORAGE APPARATUS | PROCESSOR | CLOCK CYCLE |
| 1 | 11 | 1GHz |
| 1 | 12 | 1GHz |
| 2 | 21 | 1GHz |
| 2 | 22 | 1GHz |

530 PROCESSOR MANAGEMENT TABLE

*Fig.7*

| 541 | 542 | 543 |
|---|---|---|
| STORAGE APPARATUS | CACHE | CAPACITY |
| 1 | 11 | 10GB |
| 2 | 21 | 10GB |

540 CACHE MANAGEMENT TABLE

*Fig.8*

| STORAGE APPARATUS | RAID GROUP | NUMBER OF HDDs | RAID LEVEL | CAPACITY | LU PLACEMENT AVAILABILITY |
|---|---|---|---|---|---|
| 1 | RG11 | 12 | 5 | 1TB | AVAILABLE |
| 1 | RG12 | 12 | 5 | 1TB | UNAVAILABLE |
| 1 | RG13 | 12 | 5 | 1TB | UNAVAILABLE |
| 2 | RG21 | 12 | 5 | 1TB | AVAILABLE |
| 2 | RG22 | 12 | 5 | 1TB | UNAVAILABLE |
| 2 | RG23 | 12 | 5 | 1TB | UNAVAILABLE |

550 RAID GROUP MANAGEMENT TABLE

Fig.9

| STORAGE APPARATUS | POOL | RAID GROUP | CUT-OUT CAPACITY |
|---|---|---|---|
| 1 | Pool11 | RG12 | 1TB |
| 1 | Pool11 | RG13 | 1TB |
| 2 | Pool21 | RG22 | 1TB |
| 2 | Pool21 | RG23 | 1TB |

560 POOL MANAGEMENT TABLE

Fig.10

| TENANT | LU # | STORAGE # | PORT # | PORT BANDWIDTH | PROCESSOR # | PROCESSOR CLOCK CYCLE | CACHE # | CACHE CAPACITY | RAID GROUP # /POOL # | USED CAPACITY | REQUIRED IOPS | SHARING |
|---|---|---|---|---|---|---|---|---|---|---|---|---|
| A | 11 | 1 | 11 | 2Gbps | 11 | 0.5GHz | 11 | 2.5GB | RG11 | 500GB | 600 | ALLOWED |
| B | 12 | 1 | 11 | 2Gbps | 11 | 0.5GHz | 11 | 2.5GB | RG11 | 500GB | 600 | ALLOWED |
| C | 13 | 1 | 21 | 2Gbps | 21 | 0.5GHz | 11 | 2.5GB | RG21 | 500GB | 600 | ALLOWED |
| D | 21 | 2 | 21 | 2Gbps | 21 | 0.5GHz | 21 | 2.5GB | RG21 | 500GB | 600 | ALLOWED |
| D | 22 | 2 | 22 | 2Gbps | 22 | 0.5GHz | 21 | 2.5GB | Pool21 | 1TB | 1200 | ALLOWED |
| E | 23 | 2 | 22 | 2Gbps | 22 | 0.5GHz | 21 | 2.5GB | Pool21 | 500GB | 1200 | ALLOWED |

510 TENANT MANAGEMENT TABLE

Fig.11

| TENANT | LU # | STORAGE # | PORT # | PORT BANDWIDTH | PROCESSOR # | PROCESSOR CLOCK CYCLE | CACHE # | CACHE CAPACITY | RAID GROUP # /POOL # | USED CAPACITY | REQUIRED IOPS | SHARING |
|---|---|---|---|---|---|---|---|---|---|---|---|---|
| A | 11 | 1 | 11 | 2Gbps | 11 | 0.5GHz | 11 | 2.5GB | RG11 | 500GB | 600 | ALLOWED |
| B | 12 | 1 | 11 | 2Gbps | 11 | 0.5GHz | 11 | 2.5GB | RG11 | 500GB | 600 | ALLOWED |
| C | 13 | 1 | 21 | 2Gbps | 21 | 0.5GHz | 21 | 2.5GB | RG21 | 500GB | 600 | ALLOWED |
| D | 21 | 2 | 21 | 2Gbps | 21 | 0.5GHz | 21 | 2.5GB | RG21 | 500GB | 600 | ALLOWED |
| D | 22 | 2 | 22 | 2Gbps | 22 | 0.5GHz | 21 | 2.5GB | Pool21 | 1TB | 1200 | ALLOWED |
| E | 23 | 2 | 22 | 2Gbps | 22 | 0.5GHz | 21 | 2.5GB | Pool21 | 500GB | 1200 | ALLOWED |
| F (NEW) | 31 | 2 | 21 | 2Gbps | 21 | 0.5GHz | 21 | 2.5GB | RG21 | 500GB | 600 | ALLOWED |

510 TENANT MANAGEMENT TABLE

| TENANT | LU # | STORAGE # | PORT # | PORT BANDWIDTH | PROCESSOR # | PROCESSOR CLOCK CYCLE | CACHE # | CACHE CAPACITY | RAID GROUP # /POOL # | USED CAPACITY | REQUIRED IOPS | SHARING |
|---|---|---|---|---|---|---|---|---|---|---|---|---|
| A | 11 | 1 | 11 | 2Gbps | 11 | 0.5GHz | 11 | 2.5GB | RG11 | 500GB | 600 | ALLOWED |
| B | 12 | 1 | 11 | 2Gbps | 11 | 0.5GHz | 11 | 2.5GB | RG11 | 500GB | 600 | ALLOWED |
| C | 13 | 1 | 21 | 2Gbps | 21 | 0.5GHz | 21 | 2.5GB | RG21 | 500GB | 600 | ALLOWED |
| D | 21 | 2 | 21 | 2Gbps | 21 | 0.5GHz | 21 | 2.5GB | RG21 | 500GB | 600 | ALLOWED |
| D | 22 | 2 | 22 | 2Gbps | 22 | 0.5GHz | 21 | 2.5GB | Pool21 | 1TB | 1200 | ALLOWED |
| E | 23 | 2 | 22 | 2Gbps | 22 | 0.5GHz | 21 | 2.5GB | Pool21 | 500GB | 1200 | ALLOWED |
| G (NEW) | 41 | 1 | 12 | 2Gbps | 12 | 0.5GHz | 11 | 2.5GB | Pool11 | 1TB | 1200 | ALLOWED |
| G (NEW) | 42 | 2 | 21 | 2Gbps | 21 | 0.5GHz | 21 | 2.5GB | RG21 | 500GB | 600 | ALLOWED |

510 TENANT MANAGEMENT TABLE

Fig.21

| TENANT | LU# | STORAGE # | PORT # | PORT BANDWIDTH | PROCESSOR # | PROCESSOR CLOCK CYCLE | CACHE # | CACHE CAPACITY | RAID GROUP # /POOL # | USED CAPACITY | REQUIRED IOPS | SHARING |
|---|---|---|---|---|---|---|---|---|---|---|---|---|
| A | 11 | 1 | 11 | 2Gbps | 11 | 0.5GHz | 11 | 2.5GB | RG11 | 500GB | 600 | ALLOWED |
| B | 12 | 1 | 11 | 2Gbps | 11 | 0.5GHz | 11 | 2.5GB | RG11 | 500GB | 600 | ALLOWED |
| C (MIGRATED) | 13 | 1 | 21 | 2Gbps | 21 | 0.5GHz | 21 | 2.5GB | RG21 | 500GB | 600 | ALLOWED |
| D | 21 | 2 | 21 | 2Gbps | 21 | 0.5GHz | 21 | 2.5GB | RG21 | 500GB | 600 | ALLOWED |
| D | 22 | 2 | 22 | 2Gbps | 22 | 0.5GHz | 21 | 2.5GB | Pool21 | 1TB | 1200 | ALLOWED |
| E | 23 | 2 | 22 | 2Gbps | 22 | 0.5GHz | 21 | 2.5GB | Pool21 | 500GB | 1200 | ALLOWED |
| H (NEW) | 51 | 1 | 12 | 4Gbps | 12 | 1.0GHz | 11 | 5.0GB | Pool11 | 2.0TB | 2400 | PRO-HIBITED |

Fig.22    510 TENANT MANAGEMENT TABLE

| TENANT | LU # | STORAGE # | PORT # | PORT BANDWIDTH | PROCESSOR # | PROCESSOR CLOCK CYCLE | CACHE # | CACHE CAPACITY | RAID GROUP # /POOL # | USED CAPACITY | REQUIRED IOPS | SHARING |
|---|---|---|---|---|---|---|---|---|---|---|---|---|
| A | 11 | 1 | 11 | 2Gbps | 11 | 0.5GHz | 11 | 2.5GB | RG11 | 500GB | 600 | ALLOWED |
| B | 12 | 1 | 11 | 2Gbps | 11 | 0.5GHz | 11 | 2.5GB | RG11 | 500GB | 600 | ALLOWED |
| C (MIGRATED) | 13 | 2 | 21 | 2Gbps | 21 | 0.5GHz | 21 | 2.5GB | RG21 | 500GB | 600 | ALLOWED |
| D (AFFECTED) | 21 | 2 | 21 | 2Gbps →1Gbps | 21 | 0.5GHz | 21 | 2.5GB | RG21 | 500GB | 600 | ALLOWED |
| D | 22 | 2 | 22 | 2Gbps | 22 | 0.5GHz | 21 | 2.5GB | Pool21 | 1TB | 1200 | ALLOWED |
| E | 23 | 2 | 22 | 2Gbps | 22 | 0.5GHz | 21 | 2.5GB | Pool21 | 500GB | 1200 | ALLOWED |
| H (NEW) | 51 | 1 | 12 | 4Gbps | 12 | 1.0GHz | 11 | 5.0GB | Pool11 | 2.0TB | 2400 | PRO-HIBITED |

510 TENANT MANAGEMENT TABLE

*Fig. 23*

| TENANT | LU # | STORAGE # | PORT # | PORT BANDWIDTH | PROCESSOR # | PROCESSOR CLOCK CYCLE | CACHE # | CACHE CAPACITY | RAID GROUP # /POOL # | USED CAPACITY | REQUIRED IOPS | SHARING |
|---|---|---|---|---|---|---|---|---|---|---|---|---|
| A | | | | 2Gbps | | 0.5GHz | | 2.5GB | | 500GB | 600 | ALLOWED |
| B | | | | 2Gbps | | 0.5GHz | | 2.5GB | | 500GB | 600 | ALLOWED |
| C | | | | 2Gbps | | 0.5GHz | | 2.5GB | | 500GB | 600 | |
| D | | | | 2Gbps | | 0.5GHz | | 2.5GB | | 500GB | 600 | ALLOWED |
| D | | | | 2Gbps | | 0.5GHz | | 2.5GB | | 1TB | 1200 | ALLOWED |
| E | | | | 2Gbps | | 0.5GHz | | 2.5GB | | 500GB | 1200 | ALLOWED |
| F (NEW) | | | | | | 0.5GHz | | 2.5GB | | 500GB | 600 | ALLOWED |

510A TENANT MANAGEMENT TABLE

*Fig. 24*

MULTI-CLIENT STORAGE SYSTEM AND STORAGE SYSTEM MANAGEMENT METHOD

TECHNICAL FIELD

This invention relates to a storage system in which a storage apparatus including a plurality of resources provides a plurality of clients with the plurality of resources. More particularly, this invention relates to an improvement of a technology of migrating data and changing resources when a resource is allocated to a new client.

BACKGROUND ART

There has been conventionally known a storage system for providing a plurality of clients (or tenants) with a storage apparatus including a plurality of resources. A data center operating the storage system concludes with the client a service level agreement (SLA) defining conditions for providing services, thereby guaranteeing the performance or the like of the provided resource.

In the above-mentioned storage system, in a case where a resource is to be allocated to a new client, when there is no available resource that satisfies the above-mentioned SLA, a resource that satisfies the SLA is secured by migrating data for other clients.

As examples of the technology of migrating data in providing a plurality of clients with resources in a computer system including the storage system, Japanese Patent Application Laid-open Nos. 2011-90594 A [PTL 1], 2008-176627 A [PTL 2], and 07-141270 A [PTL 3] are known.

Japanese Patent Application Laid-open No. 2011-90594 A discloses the technology for lowering the migration cost during scale-in/scale-out or workload consolidation of the cluster system to thereby reduce power consumption. Japanese Patent Application Laid-open No. 2008-176627 A discloses the technology with which migration is carried out to the access destination of the host apparatus without stopping data access between the host computer and the storage apparatus, and while continuing the functions of the storage apparatus. Japanese Patent Application Laid-open No. 07-141270 A discloses the computer system for creating a data transfer plan based on the time when the transmitted data is required, the amount of data, and the line speed so that the transmitted data is received by the time when the data is required on the reception side, and transferring the data.

CITATION LIST

Patent Literature

PTL 1: JP 2011-90594 A
PTL 2: JP 2008-176627 A
PTL 3: JP H07-141270 A

SUMMARY OF INVENTION

Technical Problem

However, in a case where the resources of the storage system are provided to the plurality of clients based on the SLA, there have been the following problems. First, in a case where data is migrated between storage apparatus in order to secure the resource to be allocated to the new client, an amount of time in proportion to the amount of data is needed. Therefore, there have been cases where I/O performances of other clients are affected when the amount of data to be migrated becomes large. Further, the SLA is different for each of the clients that use the storage system. Therefore, when data is merely migrated as in Japanese Patent Application Laid-open Nos. 2011-90594 A, 2008-176627 A, and 07-141270 A described above, there have been cases where the SLAs of the other clients are affected during, or after the completion of, the migration of data.

Moreover, in a case where a time limit is set in addition to the above-mentioned SLA as a condition for securing the resource to be allocated to the new client, when data is migrated while taking the SLAs of the other clients into consideration, there have been cases where the migration of data cannot be completed by the time limit.

This invention has been made in view of the above-mentioned problems, and therefore has an object to allocate, in providing a plurality of clients adopting different SLAs with resources of a storage system, a resource to a new client smoothly while suppressing effects on existing clients.

Solution to Problem

An aspect of the invention is a multi-client storage system comprising a management computer including a processor and a memory, for allocating resources of a plurality of storage apparatus to a plurality of clients, the management computer comprising: a receiving unit for receiving conditions for a client to which a new resource is to be allocated; a determining unit for determining whether the new resource is securable under the received conditions without changing resources allocated to existing clients and conditions for the volumes for each of the existing clients; and an allocation unit for securing, when it is determined that the new resource is securable under the received conditions, the new resource under the received conditions for the client in the plurality of storage apparatus and allocating the new resource to the client. The resource of the storage apparatus contains a port, a processor, cash, RAID group, a pool, and a logical volume (LU).

Advantageous Effects of Invention

According to this invention, it is possible to secure the resources of the storage system under the required conditions and suppress the reduction in service levels of the other clients (conditions for the volumes for each of the clients).

BRIEF DESCRIPTION OF DRAWINGS

FIG. 6 shows an embodiment of this invention, and is a diagram showing an example of a port management table.

FIG. 7 shows an embodiment of this invention, and is a diagram showing an example of a processor management table.

FIG. 8 shows an embodiment of this invention, and is a diagram showing an example of a cache management table.

FIG. 9 shows an embodiment of this invention, and is a diagram showing an example of a RAID group management table.

FIG. 10 shows an embodiment of this invention, and is a diagram showing an example of a pool management table.

FIG. 11 shows an embodiment of this invention, and is a diagram showing an example of a tenant management table.

FIG. 21 shows an embodiment of this invention, and is a diagram showing an example of a tenant management table, in which logical volumes (LU) straddling two storage apparatus 300 are allocated to a new tenant G.

FIG. 22 shows an embodiment of this invention, and is a diagram showing an example of a tenant management table 510 after migrating a resource of the existing tenant C from the storage apparatus.

FIG. 23 shows an embodiment of this invention, and is a diagram showing an example of a tenant management table, in which, in migrating the resource the tenant C to the storage apparatus SG2 and allocating the resource of the storage apparatus SG1 to the new tenant H as in the example of FIG. 22.

FIG. 24 shows an embodiment of this invention, and is a diagram showing an example of a copied table of a tenant management table.

DESCRIPTION OF EMBODIMENTS

Hereinafter, an embodiment of this invention is described with reference to the accompanying drawings.

Figure 1:
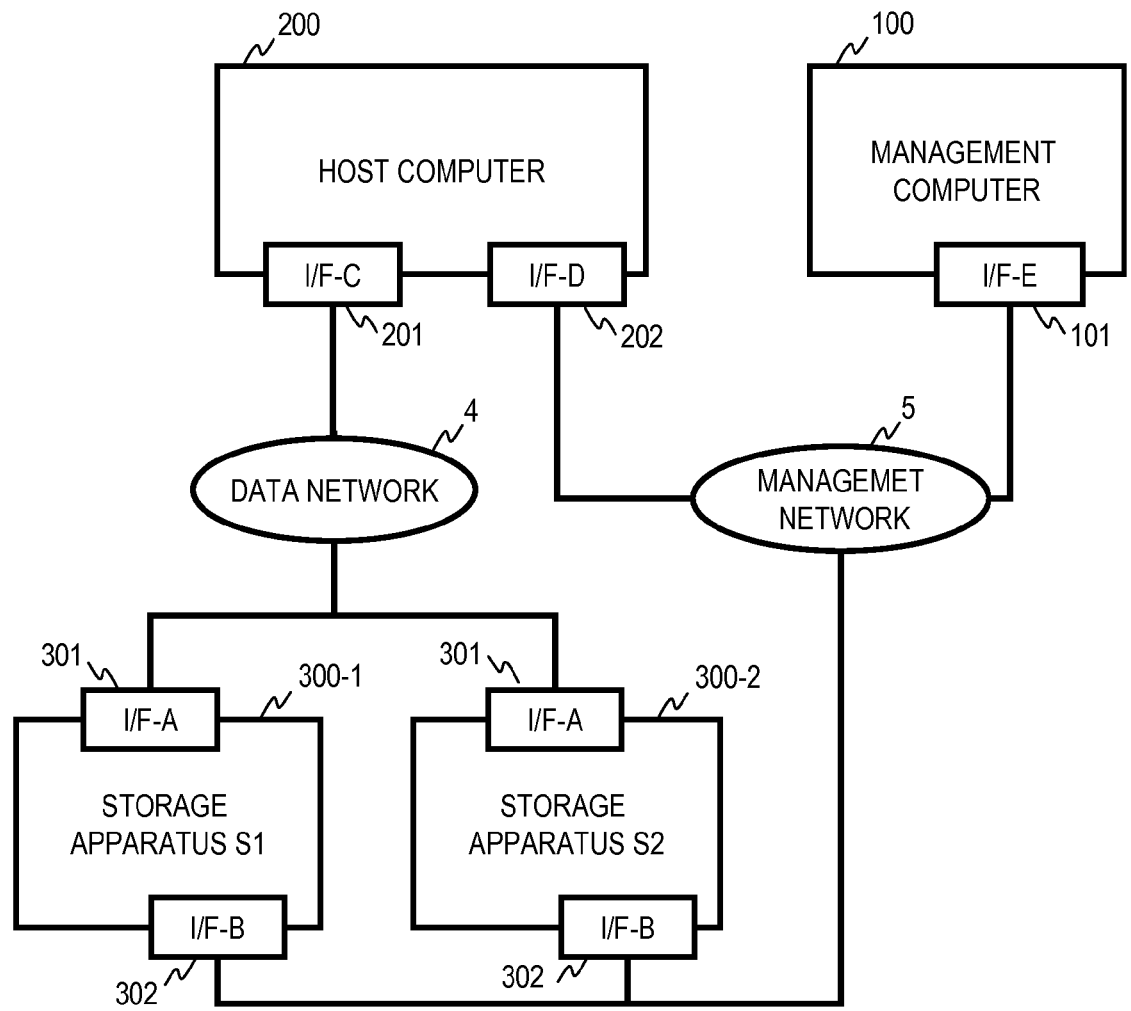
FIG. 1 shows an embodiment of this invention, and is a block diagram showing an example of a storage system.

FIG. 1 is a block diagram illustrating an example of a configuration of a storage system according to the embodiment of this invention. The storage system includes a host computer 200, which accesses a storage apparatus (S1) 300-1 and a storage apparatus (S2) 300-2, a management computer 100 for managing the host computer 200 and the storage apparatus 300-1 and 300-2, a data network 4 for coupling the host computer 200 and the storage apparatus 300-1 and 300-2, and a management network 5 for coupling the host computer 200 and each of the storage apparatus 300-1 and 300-2 and the management computer 100. It should be noted that the storage apparatus 300-1 and 300-2 have the same configuration, and the storage apparatus are collectively referred to by the reference numeral 300.

The host computer 200 and the storage apparatus 300 each have an I/O interface coupled to the data network 4 and an I/O interface coupled to the management network 5. The storage apparatus 300 includes an interface (I/F-A) 301 coupled to the data network 4, and an interface (I/F-B) 302 coupled to the management network 5. The host computer 200 includes an interface (I/F-C) 201 coupled to the data network 4, and an interface (I/F-D) 202 coupled to the management network 5. The management computer 100 includes an interface (I/F-E) 101 coupled to the management network 5.

Figure 2:
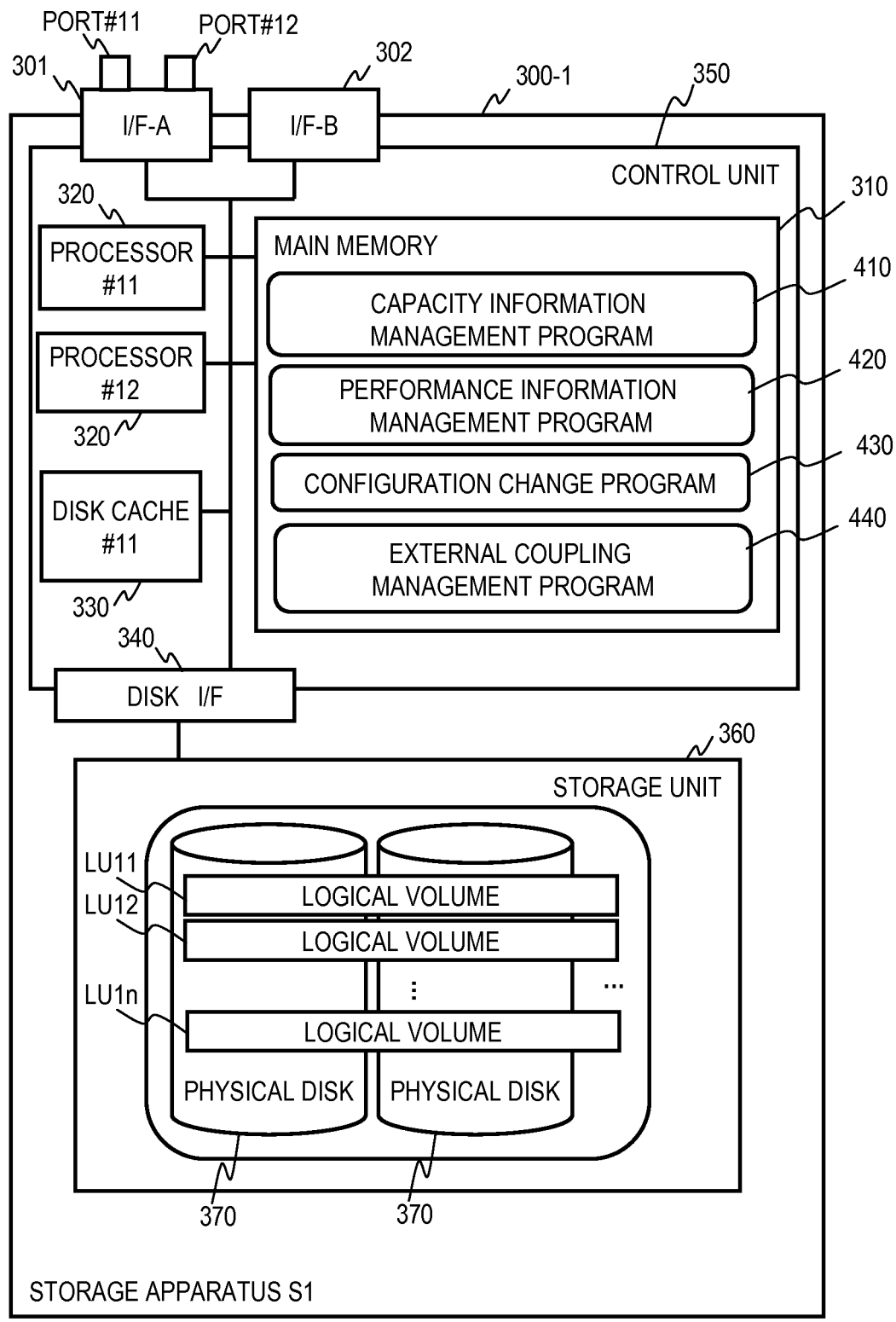
FIG. 2 shows an embodiment of this invention, and is a block diagram showing an example of a storage apparatus.

FIG. 2 is a block diagram illustrating an example of the configuration of the storage apparatus 300-1 according to the embodiment of this invention. It should be noted that the storage apparatus 300-2 has the same configuration.

The storage apparatus 300-1 includes a storage unit 360 including a plurality of physical disks 370, and a control unit 350 for controlling the storage unit 360.

Figure 5:
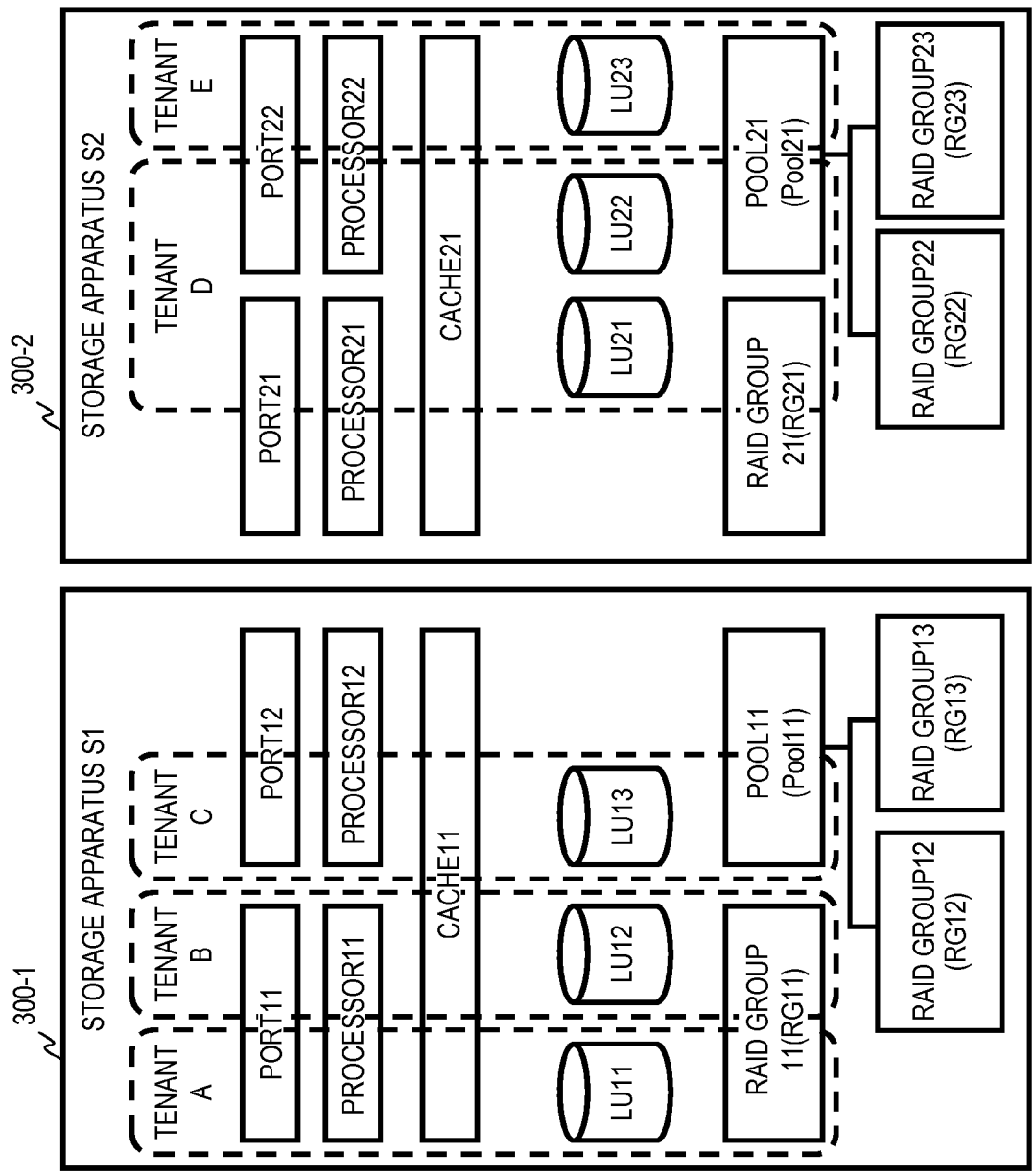
FIG. 5 shows an embodiment of this invention, and is a block diagram showing a relationship between the storage apparatus.

The control unit 350 includes a plurality of processors (#11 and #12) 320, a main memory 310 for storing data and a program, a disk cache (#11) 330 for temporarily holding data to be read and written to and from the storage unit 360, a disk interface 340 coupled to the storage unit 360, the interface (I/F-A) 301 coupled to the data network 4, and the interface (I/F-B) 302 coupled to the management network 5. It should be noted that, in this embodiment, the interface (I/F-A) 301 coupled to the data network 4 has two ports. The ports have identifiers given thereto, and for example, as illustrated in FIG. 5, the ports of the interface (I/F-A) 301 of the storage apparatus 300-1 have identifiers #11 and #12, and ports of the interface (I/F-A) 301 of the storage apparatus 300-2 have identifiers #21 and #22.

The control unit 350 controls, in response to a command from the management computer 100, a configuration of the storage unit 360, and allocation of the port of the interface (I/F-A) 301 to which the host computer 200 accesses. The control unit 350 forms a redundant array of independent disks (RAID) group from the plurality of physical disks 370 of the storage unit 360, and sets a plurality of logical volumes (or logical units: LUs) (LU) 11 to (LU) 1n on the RAID group. Alternatively, the control unit 350 may form a plurality of RAID groups from the plurality of physical disks 370, and further generate a pool from the plurality of RAID groups to set logical volumes on the pool. It should be noted that, in FIG. 5, identifiers of the logical volumes of the storage apparatus 300-2 are LU21 to LU2n. Also in FIG. 5, identifiers of the processors 320 of the storage apparatus 300-2 are #21 and #22.

The main memory 310 stores, in order for the storage apparatus 300-1 to function properly, a capacity information management program 410, a performance information management program 420, a configuration change program 430, and an external coupling management program 440, which are executed by the processors 320. Those programs are executed at a predetermined timing, such as at start-up of the storage apparatus 300-1, or in response to a command from the management computer 100.

The capacity information management program 410 acquires a capacity and a used amount of each of the logical volumes in the storage unit 360, and a capacity of each of the physical disks 370 and the RAID groups, and notifies the management computer 100 of the same.

The performance information management program 420 acquires a capacity and a response speed (or IOPS) of each of the physical disks 370 and the RAID groups of the storage apparatus 300-1, a bandwidth of each of the ports of the interfaces 301 and 302, performances (clock cycle and number of cores) of each of the processors 320, a capacity of the disk cache 330, and the like, and notifies the management computer 100 of the same. It should be noted that the IOPS is the number of I/Os processed by the storage apparatus 300 per unit time.

The configuration change program 430 generates, migrates, and deletes the RAID groups, the pools, or the logical volumes. The configuration change program 430 may also migrate data stored in the logical volumes.

The external coupling management program 440 manages, in accordance with a command from the management computer 100 or the like, the host computer 200 to be coupled to the ports (#11 and #12) of the interface (I/F-A) 301, and an access path of each of the logical volumes that can be accessed by those ports. In other words, the external coupling management program 440 sets, based on the command from the management computer 100, coupling relationships between the ports #11 and #12 accessed by the host computer 200 and the logical volumes (LU).

Figure 3:
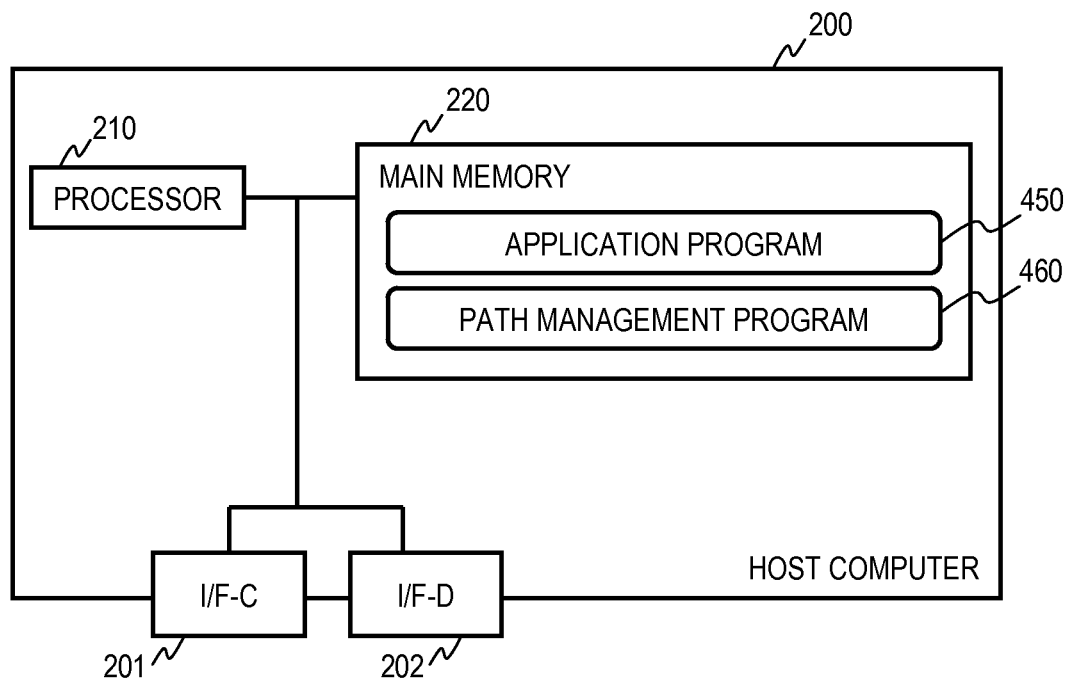
FIG. 3 shows an embodiment of this invention, and is a block diagram showing an example of a host computer.

FIG. 3 is a block diagram illustrating an example of a configuration of the host computer 200 according to the embodiment of this invention.

The host computer 200 includes a processor 210, a main memory 220 for storing data and a program, the interface (I/F-C) 201 for accessing the data network 4, and the interface (I/F-D) 202 for accessing the management network 5.

The main memory 220 stores an application program 450 for accessing the storage apparatus 300, and a path management program 460 for managing the ports and the logical volumes of the storage apparatus 300 as the access destination, which are executed by the processor 210.

It should be noted that FIG. 1 illustrates an example in which one host computer 200 is provided, but a plurality of host computers 200 may be provided depending on the number of clients or the like.

Figure 4:
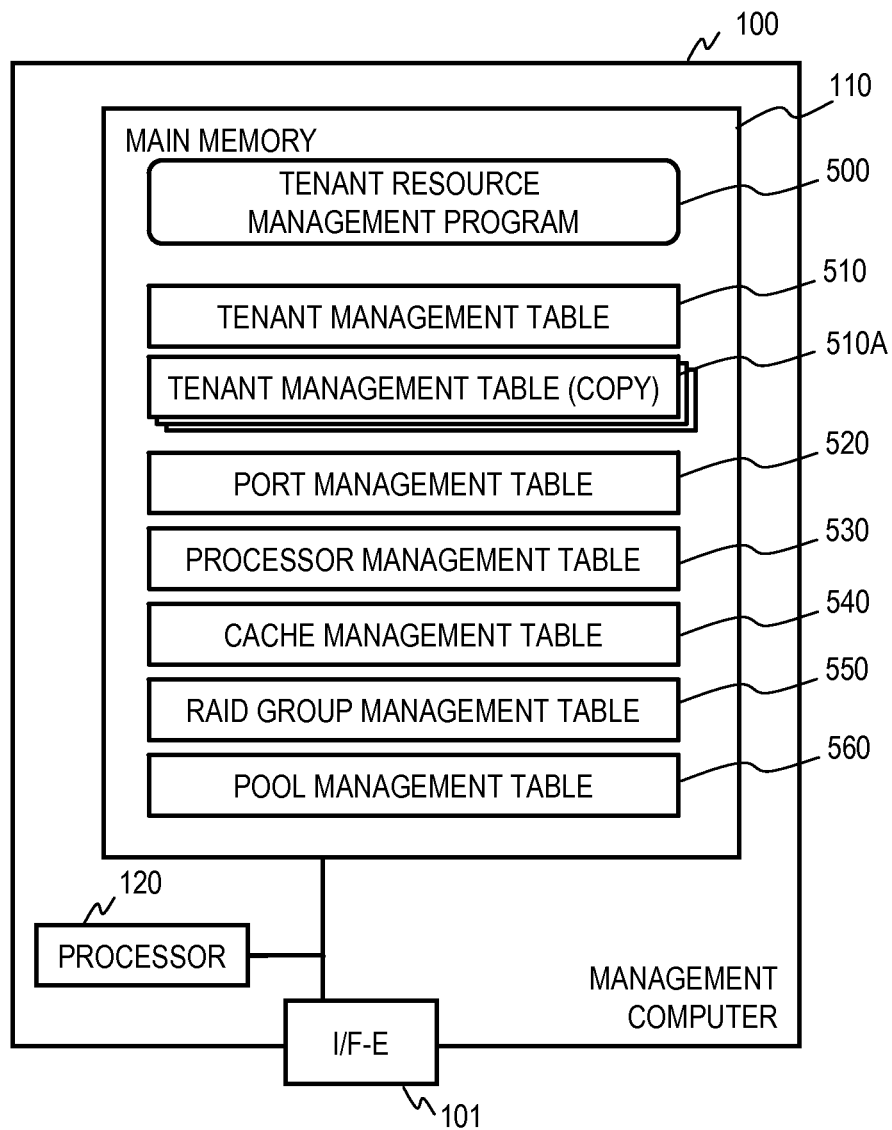
FIG. 4 shows an embodiment of this invention, and is a block diagram showing an example of a management computer.

FIG. 4 is a block diagram illustrating an example of a configuration of the management computer 100 according to the embodiment of this invention.

The management computer 100 includes a processor 120, a main memory 110 for storing data and a program, and the interface (I/F-E) 101 for accessing the management network 5.

The main memory 110 stores a tenant resource management program 500 for providing clients (hereinafter, referred to as "tenants") with resources of the storage apparatus 300, which is executed by the processor 120. The main memory 110 also stores a tenant management table 510, a port management table 520, a processor management table 530, a cache management table 540, a RAID group management table 550, and a pool management table 560, which are used by the tenant resource management program 500. Further, in allocation processing of the resources to the tenants, a copy 510A of the tenant management table 510 is held in the memory 110. It should be noted that contents of each of the tables are described later.

The processor 120 operates as a functional module for realizing a predetermined function by being operated in accordance with a program in the main memory 110. For example, the processor 120 functions as a tenant resource management module by being operated in accordance with the tenant resource management program 500. The same is true for other programs of the host computer 200, the storage apparatus 300, and the like. Further, the processor 120 also operates as a functional module for realizing each of a plurality of types of processing executed by the programs.

Information such as the programs and the tables for realizing the functions of the management computer 100, the host computer 200, and the storage apparatus 300 may be stored in a storage device such as the storage apparatus 300, a non-volatile semi-conductor memory, a hard disk drive, or a solid state drive (SSD), or a computer-readable non-transitory data storage medium such as an integrated circuit (IC) card, a Secure Digital (SD) card, or a digital versatile disc (DVD).

The management computer 100 also includes an input device (not shown) and an output device (not shown). The input device is constituted of, for example, a keyboard and a mouse. The output device is constituted of, for example, a display.

FIG. 5 is a block diagram illustrating a relationship between the storage apparatus 300 and the tenants according to the embodiment of this invention. FIG. 5 illustrates an example in which five tenants A to E use two storage apparatus 300-1 and 300-2. Each of the tenants A to E uses the storage apparatus 300 through the host computer 200.

A logical volume (LU) 11 on a RAID group 11 of the storage apparatus 300-1 is allocated to the tenant A, and a logical volume (LU)12 on the RAID group 11 of the storage apparatus 300-1 is allocated to the tenant B. The tenants A and B share a port 11 of the interface (I/F-A) and a processor 11 of the storage apparatus 300-1. A logical volume (LU) 13 on a pool 11 of the storage apparatus 300-1 is allocated to the tenant C, and the tenant C uses a port 12 and a processor 12. The tenants A to C share a disk cache 11.

A logical volume (LU) 21 on a RAID group 21 of the storage apparatus 300-2 and a logical volume (LU) 22 on a pool 21 are allocated to the tenant D, and a logical volume (LU) 23 on the pool 21 of the storage apparatus 300-2 is allocated to the tenant E. The tenants D and E share a port 22 of the interface (I/F-A) and a processor 22 of the storage apparatus 300-2. The tenant D also uses a port 21 and a processor 21 of the storage apparatus 300-2. The tenants D and E share a disk cache 21.

Next, an example of providing a new tenant with a resource (logical volume) in the storage apparatus 300 having the above-mentioned configuration is described.

FIG. 6 is a diagram illustrating an example of the port management table 520 stored in the main memory 110 of the management computer 100. The management computer 100 makes an inquiry to the performance information management program 420 of the storage apparatus 300 at, for example, predetermined intervals to acquire information on the ports of the interface (I/F-A) 301. Then, the management computer 100 generates the port management table 520 from the acquired information.

Each entry in the port management table 520 includes a field for storage apparatus 525 for storing an identifier of the storage apparatus 300, a field for port 526 for storing an identifier of a port of the interface (I/F-A) 301, and a field for bandwidth 527 for storing a bandwidth (maximum value of communication speeds) of each port. It should be noted that the port management table 520 may hold preset values.

FIG. 7 is a diagram illustrating an example of the processor management table 530 stored in the main memory 110 of the management computer 100. The management computer 100 makes an inquiry to the performance information management program 420 of the storage apparatus 300 at, for example, predetermined intervals to acquire information on the processors 320. Then, the management computer 100 generates the processor management table 530 from the acquired information.

Each entry in the processor management table 530 includes a field for storage apparatus 531 for storing an identifier of the storage apparatus 300, a field for processor 532 for storing an identifier of the processor 320, and a field for clock cycle 533 for storing a maximum value of the operation clock of the processor 320. It should be noted that the processor management table 530 may hold preset values.

FIG. 8 is a diagram illustrating an example of the cache management table 540 stored in the main memory 110 of the management computer 100. The management computer 100 makes an inquiry to the capacity information management program 410 of the storage apparatus 300 at, for example, predetermined intervals to acquire information on the disk cache 330. Then, the management computer 100 generates the cache management table 540 from the acquired information.

Each entry in the cache management table 540 includes a field for storage apparatus 541 for storing an identifier of the storage apparatus 300, a field for cache 542 for storing an identifier of the disk cache 330, and a field for capacity 543 for storing the capacity of the disk cache 330. It should be noted that the cache management table 540 may hold preset values.

FIG. 9 is a diagram illustrating an example of the RAID group management table 550 stored in the main memory 110 of the management computer 100. The management computer 100 makes an inquiry to the capacity information management program 410 of the storage apparatus 300 at, for example, predetermined intervals to acquire information on the RAID groups. Then, the management computer 100 generates the RAID group management table 550 from the acquired information.

Each entry in the RAID group management table 550 includes a field for storage apparatus 551 for storing an identifier of the storage apparatus 300, a field for RAID group 552 for storing an identifier of the RAID group, a field for number of HDDs 553 for storing the number of physical disks 370, a field for RAID level 554 for storing a RAID level, a field for capacity 555 for storing the capacity of the RAID group, and a field for LU placement availability 556 for storing information on whether or not a logical volume (LU) can be placed. It should be noted that the RAID group management table 550 may hold preset values.

FIG. 10 is a diagram illustrating an example of the pool management table 560 stored in the main memory 110 of the management computer 100. The management computer 100 makes an inquiry to the capacity information management program 410 of the storage apparatus 300 at, for example, predetermined intervals to acquire information on the pools. Then, the management computer 100 generates the pool management table 560 from the acquired information.

Each entry in the pool management table 560 includes a field for storage apparatus 561 for storing an identifier of the storage apparatus 300, a field for pool 562 for storing an identifier of the pool, a field for RAID group 563 for storing an identifier of the RAID group constituting the pool, and a field for cut-out capacity 564 for storing the capacity allocated from the RAID groups to the pool. It should be noted that the pool management table 560 may hold preset values.

FIG. 11 is a diagram illustrating an example of the tenant management table 510 stored in the main memory 110 of the management computer 100. The tenant resource management program 500 of the management computer 100 updates the tenant management table 510 after a resource to be used by a new tenant is added or the resources used by the existing tenants are relocated.

The tenant management table 510 mainly manages the logical volumes (LU) of the storage apparatus 300 to be allocated to the tenant, access paths, and allocation of the resources of the storage apparatus 300.

Each entry in the tenant management table 510 includes a field for tenant 511 for storing an identifier of the tenant, a field for LU #512 for storing an identifier of the logical volume (LU) used by the tenant, a field for storage #513 for storing an identifier of the storage apparatus 300 that provides the logical volume (LU), a field for port #514 for storing an identifier of the port 301 for accessing the logical volume (LU), a field for port bandwidth 515 for storing the bandwidth (transfer speed) allocated to the port, a field for processor #516 for storing an identifier of the processor 320 allocated in the storage apparatus 300, a field for processor clock cycle 517 for storing the amount of resources available in the processors 320 as the clock cycle, a field for cache #518 for storing an identifier of the disk cache 330 used in the storage apparatus 300, a field for cache capacity 519 for storing the capacity of the disk cache 330 that can be used in accessing the logical volume (LU), a field for RAID group #/pool #520 for storing an identifier of the RAID group or the pool constituting the logical volume, a field for used capacity 521 for storing the available capacity of the logical volume (LU), a field for required IOPS 522 for storing an I/O performance (I/O per second) required by the service level agreement (SLA) defining conditions for providing services under contract with the tenant, and a field for sharing 523 for setting whether or not the RAID group or the pool can be shared with another tenant.

In FIG. 11, for example, to the tenant D, the logical volumes (LU) 21 and (LU) 22 of the storage apparatus (S2) 300-2, the ports 21 and 22 of the storage apparatus (S2) 300-2, and the bandwidth of 2 Gbps of each of the ports 21 and 22 are allocated. Also, the processors 21 and 22 are allocated, and the clock cycle of 0.5 GHz of each of the processors 21 and 22 is allocated as the available resource. Further, when the tenant D accesses the storage apparatus (S2) 300-2 from the host computer 200 or the like, the cache 21 is used, and in accessing the logical volumes (LU) 21 and (LU) 22, the cache of 2.5 GB is allocated to each of the logical volumes (LU)21 and (LU) 22 for use. With respect to the logical volume (LU) 21, 500 GB of the RAID group 21 is allocated, 600 IOPS is allocated as a requirement of the SLA, and the RAID group is set to be shared with another tenant. Similarly, with respect to the logical volume (LU) 22, 1 TB of the pool 21 is allocated, and 1200 IOPS is allocated as a requirement of the SLA, and the pool is set to be shared with another tenant.

Figure 12:
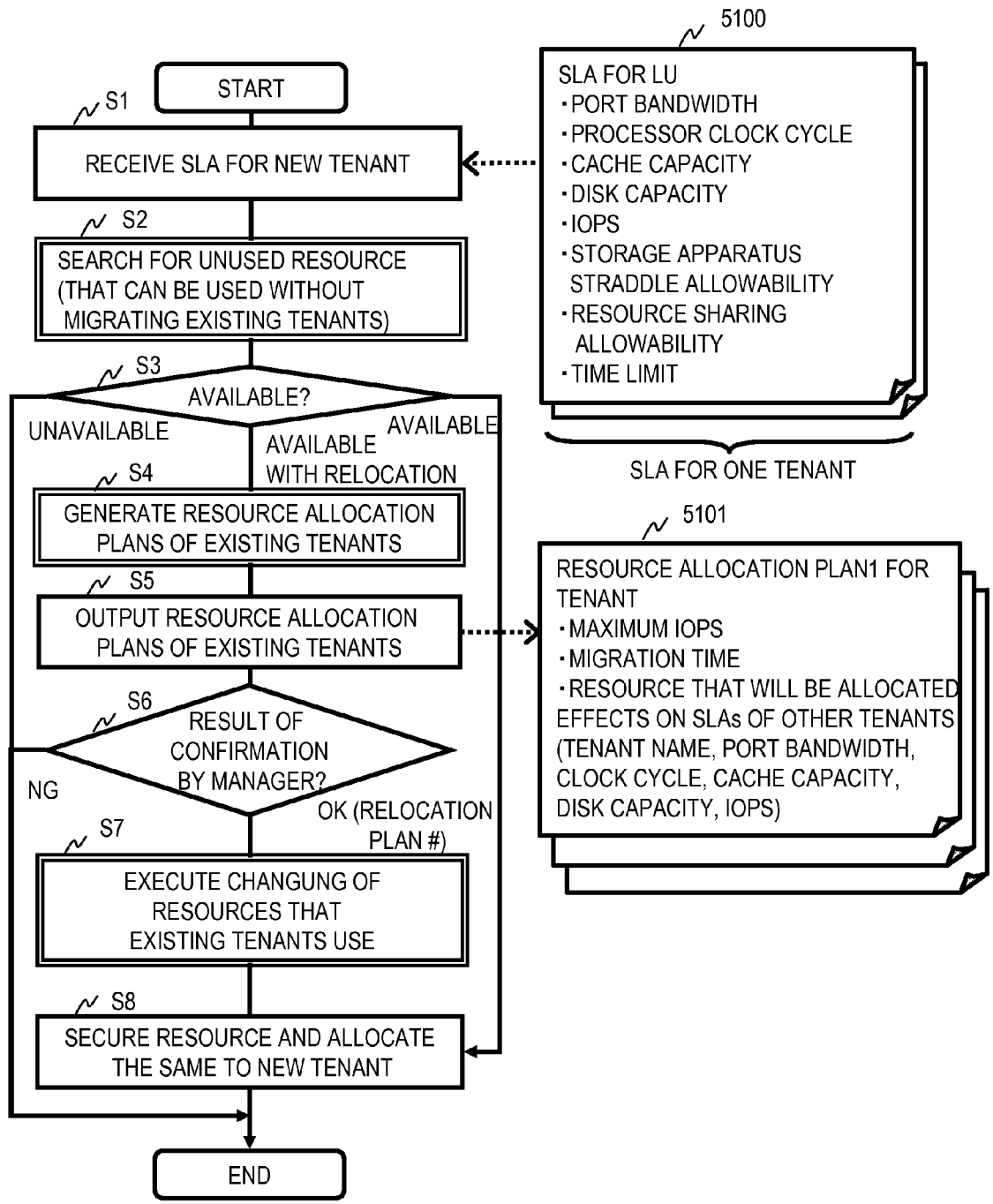
FIG. 12 shows an embodiment of this invention, and is a flow chart showing an example of processing performed by the tenant resource management program.

FIG. 12 is a flow chart illustrating an example of processing performed by the tenant resource management program 500 of the management computer 100. This processing is executed when a new logical volume (LU) is to be allocated. For example, the processing is executed after a manager inputs allocation of a new logical volume (LU) as an SLA for LU 5100 from the input device of the management computer 100.

The SLA for LU 5100 is input to the management computer 100 by the manager or the like as an SLA for a new logical volume (LU) of the SLAs to be allocated to the tenant. It should be noted that the management computer 100 may receive an SLA or the like for a resource to be allocated to the host computer 200 or the data network 4. As illustrated in FIG. 12, in the SLA 5100 for the logical volume (LU) to be newly allocated to the tenant, as a resource to be allocated to the logical volume (LU) and conditions, a port bandwidth, a clock cycle of the processor 320, a cache capacity, a disk capacity, required IOPS, allowability of straddling the storage apparatus, allowability of sharing the resource with another tenant, a time limit, and a tenant are set. These items should not set everything, and may set the default value by management computer 100. The item except the above can be used for the item of the SLA for the logical volume (LU), if being the item which can specify the service level.

In Step S1, the management computer 100 receives the SLA 5100 for the logical volume (LU) to be newly allocated (receiving unit). Next, in Step S2, the management computer 100 searches the resource of the storage apparatus 300 for a resource that can be newly allocated to a new tenant without migrating the resource that existing tenants uses.

In Step S3, the management computer 100 determines whether a resource that can be newly allocated to a new tenant without migrating the resource that existing tenants use is available, a resource can be newly allocated to a new tenant if the resource that the tenants use are migrated, or a resource that can be allocated to a new tenant is unavailable (determining unit).

The processing proceeds to Step S8 when a resource that can be newly allocated to a new tenant without migrating the resource that existing tenants use is available, proceeds to Step S4 when a resource can be newly allocated to a new tenant if the resource that existing tenants use are migrated, or ends when a resource that can be newly allocated to a new tenant is unavailable. It should be noted that, when a resource cannot be allocated to a new tenant, the management computer 100 may output to the output device an alarm indicating that allocation of the resource is stopped.

In Step S8, the management computer 100 allocates a resource to the new tenant (allocation unit). Then, the management computer 100 adds a new entry to the tenant management table 510 and writes details of the allocation.

In Step S4, in order to allocate a resource to a new tenant, the management computer 100 generates a resource allocation plan 5101 for the resource that existing tenants use as described below. The resource allocation plan 5101 is an allocation plan in which the management computer 100 changes the resources that are already allocated to the tenants and allocates a resource to a new tenant.

In Step S5, the management computer 100 outputs the resource allocation plan 5101 for the logical volumes, which is generated in Step S4 described above, to the output device. The resource allocation plan 5101 may include, for example, maximum IOPS, data (volume) migration time, a resource will be allocated to a tenant, effects on other SLAs (port bandwidth, clock cycle, cache capacity, and disk capacity), and the like. The management computer 100 may generate a plurality of the allocation plans.

Next, in Step S6, the manager or the like determines whether or not to accept the resource allocation plans 5101 generated in Step S5, and the management computer 100 receives the determination. The processing proceeds to Step S7 when the manager accepts any one of the allocation plans, or ends when the manager rejects the allocation plans.

In Step S7, in accordance with the allocation plan accepted by the manager, the management computer 100 executes changing of the resources that existing tenants use as described below, and then allocates a resource to the new tenant. In Step S8, the management computer 100 updates entries of the changing of resources in the tenant management table 510, and adds an entry of the new tenant.

Figure 13:
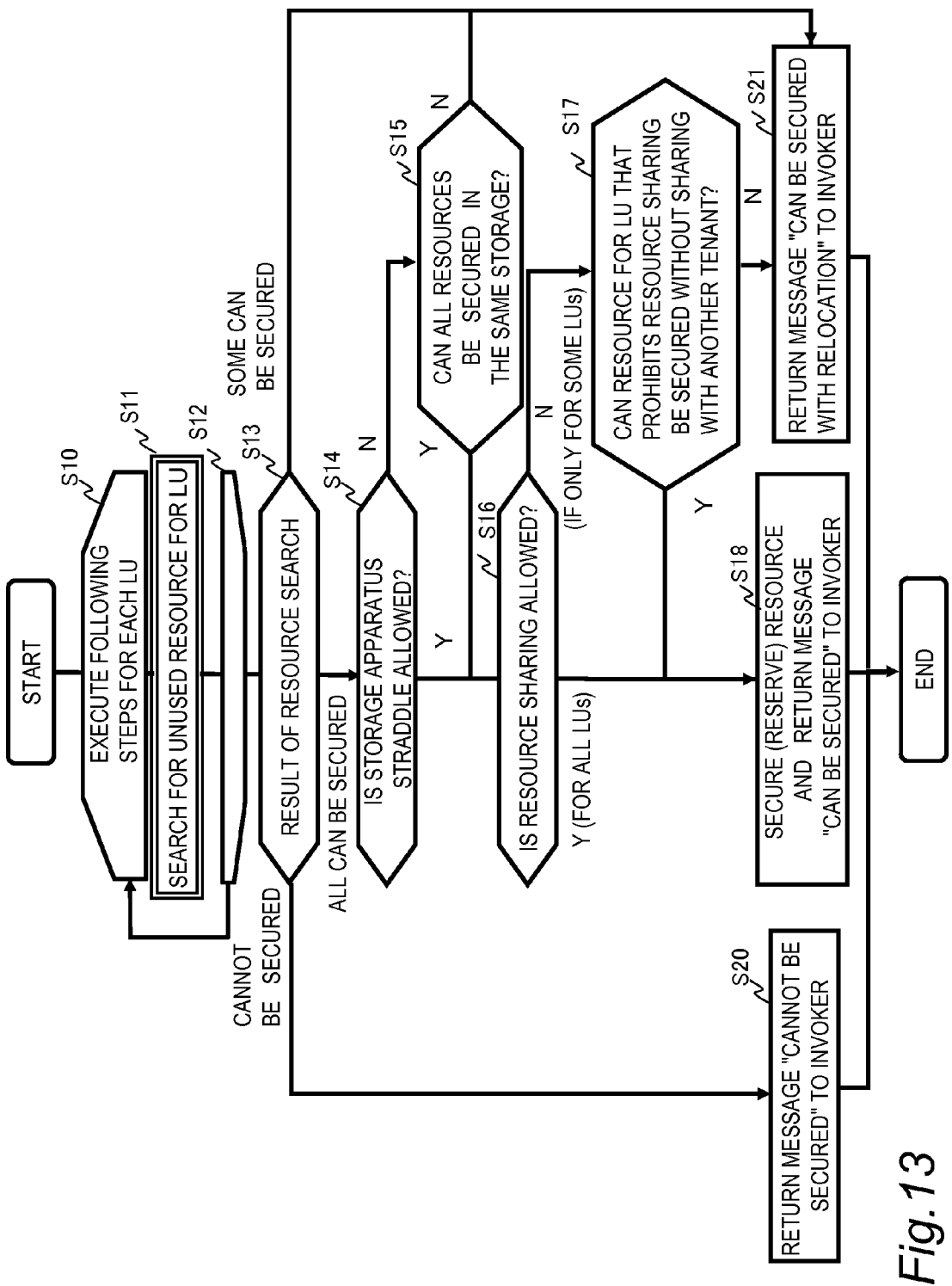
FIG. 13 shows an embodiment of this invention, and is a flow chart showing an example of processing of searching for an unused resource, which is performed in Step S2 of FIG. 12.

FIG. 13 is a flow chart illustrating an example of the processing of searching for an unused resource, which is performed in Step S2 of FIG. 12 described above. This flow chart illustrates processing in which the management computer 100 searches for a logical volume that can be newly allocated to a tenant without migrating the existing logical volumes.

In Step S10, the management computer 100 repeats Steps S11 and S12 for every logical volume (LU) in the storage apparatus 300. In Step S11, the management computer 100 searches the logical volumes (LU) of the storage apparatus 300 for an available logical volume as an unused resource as described below.

In Step S13, the management computer 100 makes a determination on the result of searching for an unused resource. The processing proceeds to Step S14 when all resources required by the SLA for LU 5100 can be secured, to Step S20 when the required resources cannot be secured, or to Step S21 when some of the required resources can be secured.

In Step S20, which is performed when the resources that can be secured are unavailable, a message "cannot be secured" is returned as the search result, and the processing returns to the processing of FIG. 12. In Step S21, which is performed when some of the resources can be secured, a message "can be secured with relocation" is returned as the search result, and the processing returns to the processing of FIG. 12. The processing proceeds to Step S14 when all the resource can be secured.

In Step S14, the management computer 100 determines whether or not the resource required by the SLA for LU 5100 are allowed to straddle the storage apparatus 300. The management computer 100 can generates one logical volume by allocating the resource of a plurality of storage apparatus 300-1 and 300-2 when the logical volumes that straddle the storage apparatus 300 are allowed by the SLA for LU 5100. Foe example, the management computer 100 can generate a new logical volume from two logical volumes by allocating one logical volume of storage apparatus 300-1 to a new logical volume, and allocating one logical volume of storage apparatus 300-2 to a new logical volume. However, the management computer 100 can't generate the logical volume (LU) from a plurality of storage apparatus when requested logical volume is only one logical volume (LU). In addition, the manager can set to allow by straddling over a plurality of the storage apparatus. The processing proceeds to Step S16 when the resources that straddle the storage apparatus 300 are allowed by the SLA for LU 5100, or to Step S15 otherwise.

In Step S15, based on the result of searching in Step S11, the management computer 100 determines whether or not the resources required by the SLA for LU 5100 can be secured in the same storage apparatus 300. The processing proceeds to Step S16 when the management computer 100 determines that all the resources can be secured in the same storage apparatus 300, or to Step S21 described above when the management computer 100 determines that the resources straddle the storage apparatus 300.

In Step S16, the management computer 100 determines, for each of the resources required by the SLA for LU 5100, whether or not sharing of the resource with another tenant is allowed. The processing proceeds to Step S18 when the management computer 100 determines that the resource sharing with another tenant is allowed by the SLA for LU 5100, or to Step S17 otherwise.

In Step S17, based on the result of searching in Step S11 described above, the management computer 100 determines whether or not the resources that can be allocated without sharing the resource with another tenant are available. The processing proceeds to Step S18 when the management computer 100 determines that resources that can be allocated without sharing the resource with another tenant is available, or to Step S21 otherwise.

In Step S18, a new resource can be allocated to the tenant without changing the resources that existing tenants. Therefore, the management computer 100 secures the SLA for LU 5100, and the processing returns to the processing of FIG. 12.

Figure 14:
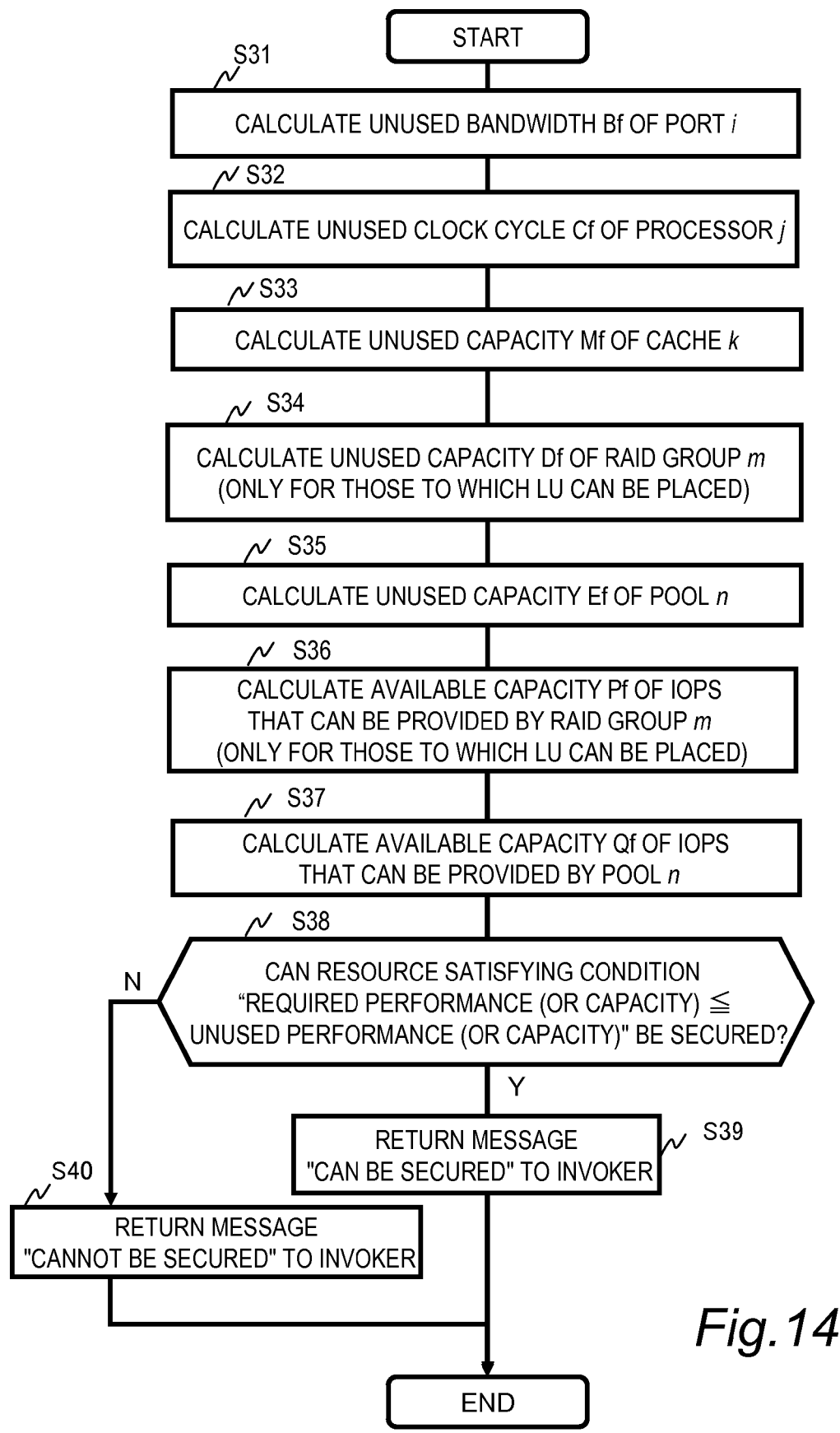
FIG. 14 shows an embodiment of this invention, and is a flow chart showing an example of processing of searching for an unused resource for each of the logical volumes (LU), which is performed in Step S11 of FIG. 13.

FIG. 14 is a flow chart illustrating an example of the processing of searching for an unused resource for each of the logical volumes (LU), which is performed in Step S11 of FIG. 13. The processing of FIG. 14 is executed sequentially for each of the logical volumes (LU).

First, in Step S31, the management computer 100 calculates an unused bandwidth $Bf[i]$ for each port i of the storage apparatus 300 from the following equation:

$$Bf[i]=\text{(bandwidth of port } i\text{)}-\Sigma\text{(bandwidth of tenant to which port } i \text{ is allocated).} \quad \text{[Math.1]}$$

Next, in Step S32, the management computer 100 calculates an unused clock cycle $Cf[j]$ for each processor j of the storage apparatus 300 from the following equation:

$$Cf[j]=\text{(clock cycle of processor }j\text{)}-\Sigma\text{(clock cycle of tenant to which processor } j \text{ is allocated).} \quad \text{[Math.2]}$$

In Step S33, the management computer 100 calculates an unused capacity $Mf[k]$ for each cache k of the storage apparatus 300 from the following equation:

$$Mf[k]=\text{(capacity of cache }k\text{)}-\Sigma\text{(cache capacity of tenant to which cache } k \text{ is allocated).} \quad \text{[Math.3]}$$

In Step S34, the management computer 100 calculates an unused capacity $Df[m]$ of a RAID group m to which a logical volume (LU) can be newly allocated from the following equation:

$$Df[m]=\text{(capacity of RAID group }m\text{)}-\Sigma\text{(used capacity of tenant to which RAID group } m \text{ is allocated).} \quad \text{[Math.4]}$$

In Step S35, the management computer 100 calculates an unused capacity $Ef[n]$ of a pool n from the following equation:

$$Ef[n]=\text{(capacity of pool }n\text{)}-\Sigma\text{(used capacity of tenant to which pool } n \text{ is allocated).} \quad \text{[Math.5]}$$

In Step S36, the management computer 100 calculates an available capacity $Pf[m]$ of IOPS that can be provided by the RAID group m to which a logical volume (LU) can be newly allocated from the following equation:

$$Pf[m]=\text{(number of physical disks constituting RAID group }m\text{)}\times\text{(maximum IOPS per disk)}-\Sigma\text{(required IOPS of } LU \text{ placed in RAID group } m\text{).} \quad \text{[Math.6]}$$

In Step S37, the management computer 100 calculates an available capacity $Qf[n]$ of IOPS that can be provided by the pool n from the following equation:

$$Qf[n]=\text{(number of physical disks of RAID groups constituting pool }n\text{)}\times\text{(maximum IOPS per disk)}-\Sigma\text{(required IOPS of } LU \text{ placed in pool } n\text{).} \quad \text{[Math.7]}$$

In Step S38, the above-mentioned management computer 100 determines whether or not a resource can be secured which satisfies the condition that the performances (or capacities) required by the SLA for LU 5100 are equal to or lower than the above-mentioned unused performances (or capacities) $Bf[i]$ to $Qf[n]$. The processing proceeds to Step S39 when the management computer 100 determines that the resource that satisfies the performances (or capacities) required by the SLA for LU 5100 can be secured, or to Step S40 otherwise.

In Step S39, the resources that can be secured as the unused resource is held, and the processing returns to the processing of FIG. 13. In Step S40, on the other hand, a message indicating that the unused resource cannot be secured is returned, and the processing returns to the processing of FIG. 13.

Figure 15:
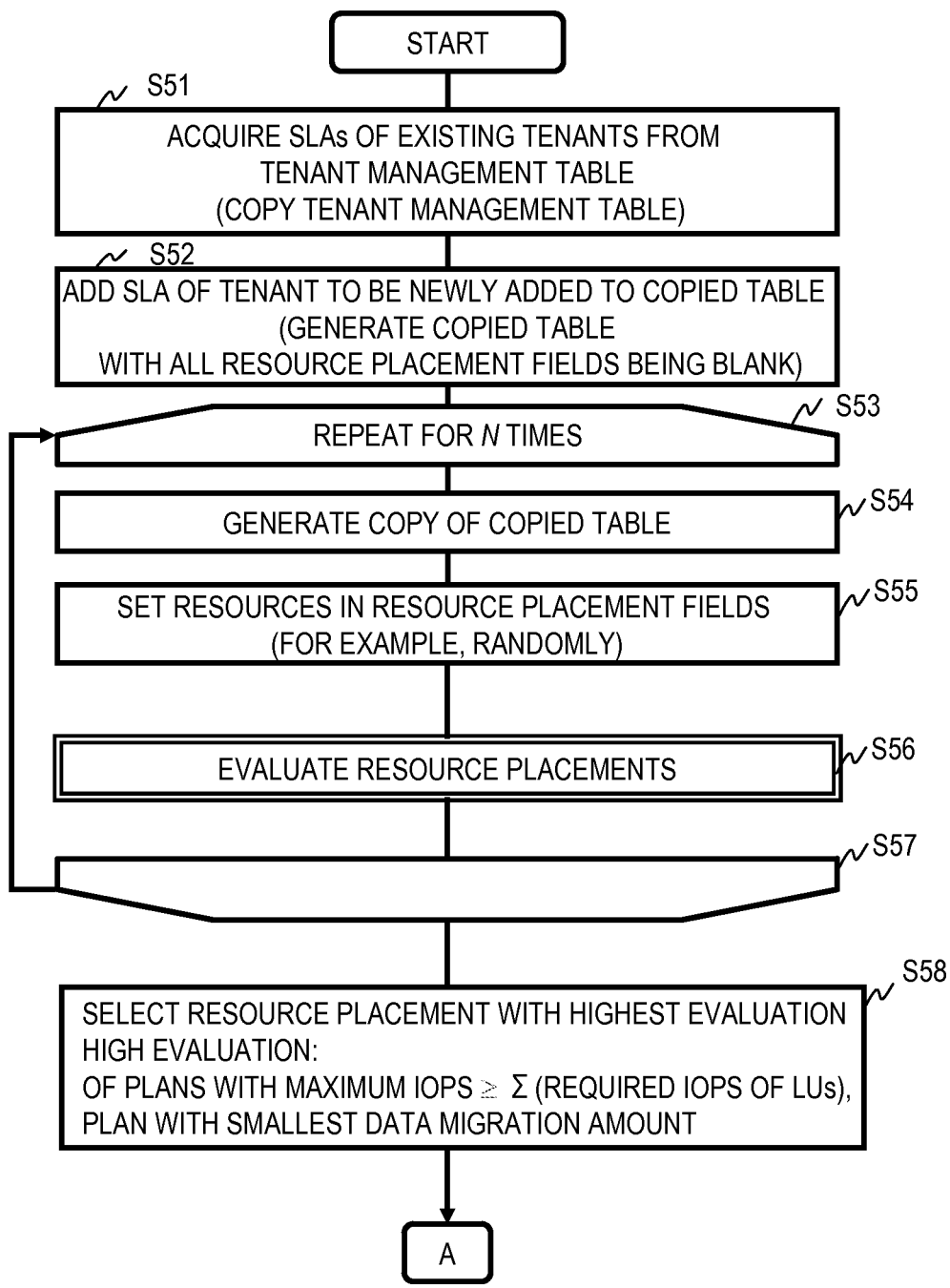
FIG. 15 shows an embodiment of this invention, and is a flow chart showing an example of the first half of processing of generating the allocation plan for the existing volumes, which is performed in Step S4 of FIG. 12.
Figure 16:
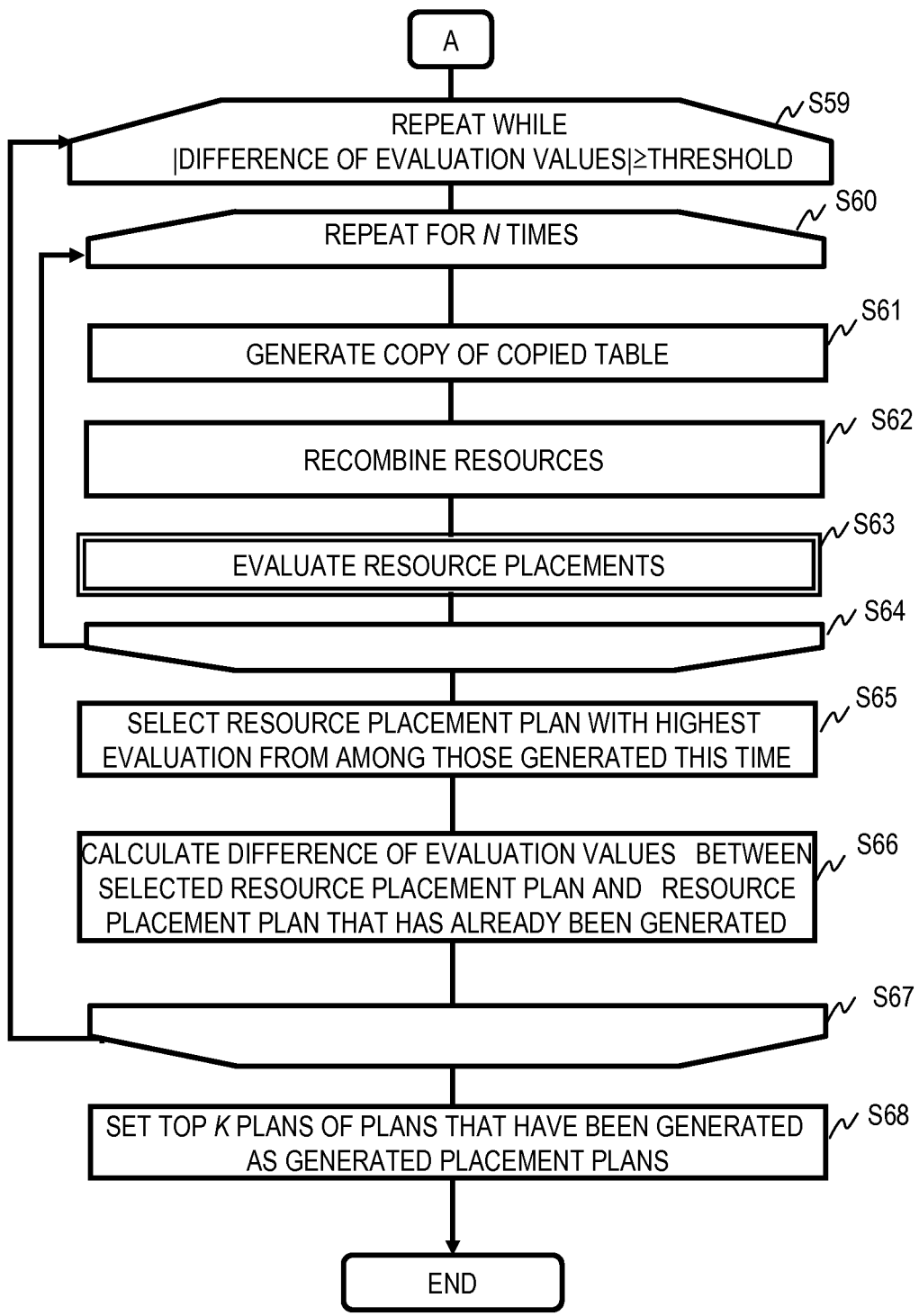
FIG. 16 shows an embodiment of this invention, and is a flow chart showing an example of the second half of processing of generating the allocation plan for the existing volumes, which is performed in Step S4 of FIG. 12.

FIGS. 15 and 16 are flow charts illustrating the processing of generating the allocation plan for the resources that existing tenants use, which is performed in Step S4 of FIG. 12. It should be noted that FIG. 15 illustrates the first half of the processing, and that FIG. 16 illustrates the second half of the processing.

In Step S51, the tenant management table 510 is read to read the SLA for each of the logical volumes (LU) allocated to the existing tenants. From the tenant management table 510, the SLA is read for each of the logical volumes (LU) allocated to the tenants. Further, the management computer 100 generates a copy of the tenant management table 510 and holds the copy in the main memory 110. Hereinafter, the generated copy is referred to as "copied table 510A".

In Step S52, as illustrated in FIG. 24, an entry of a tenant to be added (in the figure, F) is added to the copied table 510A of the tenant management table, with fields for identifying the resources of all the tenants (LU #512, storage #513, processor #516, cache #518, RAID group #/pool #520) being blank, and with other fields regarding performances being unchanged. Contents of the fields regarding performances of the new tenant in the copied table 510A are added from the SLA 5100. Specifically, the port bandwidth 515, the processor clock cycle 517, the cache capacity 519, the used capacity 521, the required IOPS 522, and the sharing 523 are written from the SLA for LU 5100 illustrated in FIG. 12 to the copied table 510A of FIG. 24.

In other words, in Step S52, the base of the copied table 510A for considering a resource allocation plan (relocation plan for existing volumes) is generated from the copy of the tenant management table 510 with values being set in the fields regarding the SLA, and with the fields for identifying the resources being blank.

Next, a loop of Steps S53 to S57 is performed N times, with N being a previously set number. First, in Step S54, the management computer 100 generates a copy of the copied table 510A and holds the generated copy in the main memory 110. The copied tables generated by repeating the loop N times are hereinafter referred to as "copied tables 510A-1 to 510A-N".

In Step S55, the management computer 100 randomly sets a logical volume (LU), a storage apparatus 300, a port, and a processor in resource allocation fields of a copied table 510A-x. It should be noted that the allocation of the resources may be performed by round robin.

Figure 17:
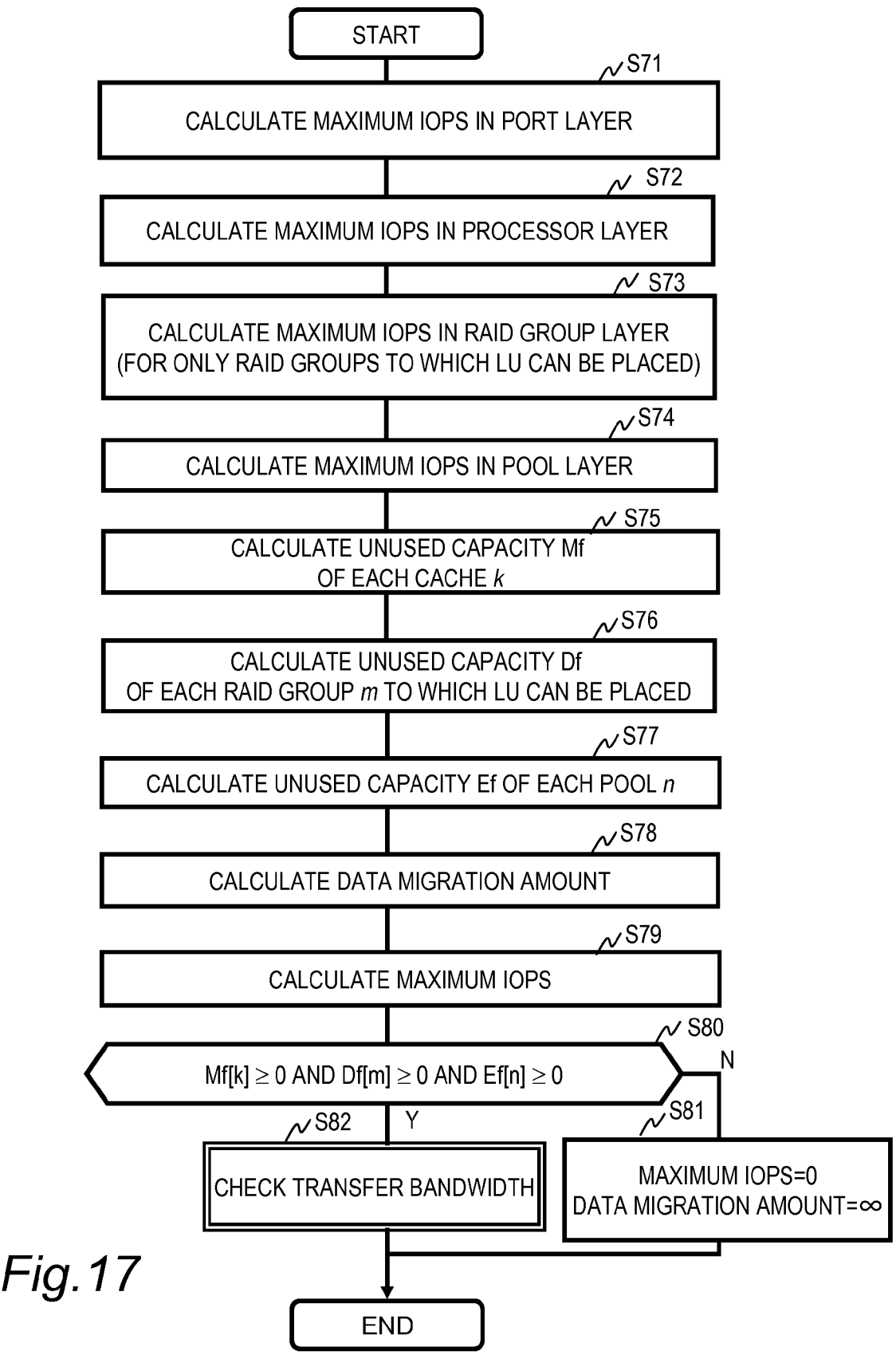
FIG. 17 shows an embodiment of this invention, and is a flow chart showing an example of the processing of evaluating the resource allocation plans, which is performed in Step S56 of FIG. 15 and Step S63 of FIG. 16.

In Step S56, the resources that are randomly set in Step S55 are evaluated as flow chart of FIG. 17 and the management computer 100 computes the evaluation value from the following equation.

$$\text{evaluation value}=\text{maximum IOPS}=\Sigma(\text{required IOPS of } LUs) \quad \text{[Math.8]}$$

In Step S57, when N repetitions of the loop are complete, the processing proceeds to Step S58. At this stage, N copied tables, which are different in the resources to be allocated to the tenants, are generated as new resource allocating plans.

In Step S58, from among the resource allocation combinations of the copied tables 510A-1 to 510A-N, the copied table 510A-x with the evaluation value in Step S56 being the largest and with the data migration amount between the storage apparatus 300 or the logical volumes (LU) being the smallest is selected. In other words, the copied table 510A-x satisfying the IOPS 522, which is a performance requirement defined in the SLA for each of the tenants, and having the smallest data migration amount between the storage apparatus 300 and the smallest data migration amount in the storage apparatus is selected as a resource allocation plan with the highest evaluation.

In Steps S59 to S67, based on the configuration of the copied table 510A-x, which is the resource allocation plan with the highest evaluation selected in Step S58, further consideration is given on whether or not there is an optimal resource allocation combination. This is because the resource allocation plan with the highest evaluation obtained after repeating the loop of the random resource allocation of FIG. 15 N times may not necessarily be the optimal resource allocation plan when the scale of the storage apparatus 300 is large.

Therefore, in Steps S59 to S67, based on the resource allocation plan with the highest evaluation in N repetitions of the loop of FIG. 15, search is further performed for resource allocation combinations with higher evaluation values. This search is repeated while the absolute value of the difference of evaluation values computed in Step S66 is equal to or larger than a preset threshold. In other words, the exit condition of the loop of Steps S59 to S67 is that the absolute value of the difference of evaluation values becomes smaller than the predetermined threshold. The exit condition is satisfied when recombination of the resource allocations does not lead to improvement in the evaluation value indicating the performance any more. It should be noted that, for convenience, the only evaluation value to be compared with the threshold is the difference of the values of maximum IOPS. It should be noted that the difference of the evaluation values indicates a change in performance due to the recombination of the resources, which means that the loop is repeated until the change in performance converges.

A loop of Steps S60 to S64 is repeated N times, with N being a predetermined number.

First, in Step S61, the management computer 100 generates a copy of the copied table 510A-x, which is the resource allocation plan with the highest evaluation selected in Step S58 described above. The copied tables generated by repeating the loop of Steps S60 to S64 N times are hereinafter referred to as "copied tables 510A-(i)-1 to 510A-(i)-N". It should be noted that i is a value indicating the generation of the resource allocation plan.

In Step S62, the resource allocations of the copied table generated by copying in Step S61 are recombined. This recombination may include performing by using resource of same LU# in based copied table 510A-x, or resource of same LU# in other copied table 510A-y. The other resources may be selected randomly or recombined in a predetermined order, for example, by round robin.

In Step S63, for the copied table 510A-(i) obtained by recombining the resource allocations in Step S62 described above, the evaluation value (maximum IOPS of the current resource allocation plan) is computed as described below.

When N repetitions of the loop end in Step S64, the processing proceeds to Step S65. In Step S65, the management computer 100 selects, from among the copied tables 510A-(i)-1 to 510A-(i)-N obtained this time in the N repetitions of the loop, a copied table 510A-(i)-x, which is the resource allocation plan with the highest evaluation.

In Step S66, the maximum IOPS and the data migration amount of the copied table 510A-(i)-x, which is the resource allocation plan with the highest evaluation obtained this time, are computed. Then, the absolute value of the difference from the maximum IOPS of the copied table 510A-(i−1)-x with the highest evaluation value of the resource allocation plans that have already been generated is obtained as the absolute value of the difference of evaluation values.

In Step S67, the processing exits the loop when the absolute value of the difference of evaluation values becomes smaller than the threshold, and proceeds to Step S68.

In Step S68, from among the copied tables 510A-(i)-1 to 510A-(i)-N generated in the loop of Steps S59 to S67, K of the copied tables 510A-(i)-1 to 510A-(i)-N are selected in the descending order of the maximum IOPS and in the ascending order of the data migration amount to be output as the resource allocation plans to the output device.

It should be noted that, in Steps S61 to S63 of FIG. 16 described above, there has been described an example in which the resource allocation plan with the highest evaluation is inherited, but another resource allocation plan may be inherited or the allocation plan of its own may be used. Alternatively, a resource may be selected randomly. Thus, it becomes possible to increase the variation of the resource allocation plan 5101 newly generated more efficiently by expanding choices of the plan that becomes an inheritance origin. As a result, it becomes easy to escape from the local optimum.

As described above, based on the resource allocation plan with the highest evaluation of the N resource allocation plans, which is selected in Step S58, the volume (resource) allocations are further recombined to generate a new allocation plan a plurality of (N) times, and evaluation values regarding the performances of the plurality of generated allocation plans are obtained, to thereby select the allocation plan with the highest evaluation value from among the plurality of allocation plans. Further, the volume allocations are recombined to generate a plurality of new allocation plans, and evaluation values regarding performances of the plurality of generated allocation plans are obtained, to thereby select the allocation plan with the highest evaluation value from among the plurality of the allocation plans. By thus repeating the recombination of the resource allocations until the difference of maximum evaluation values converges, it is possible to search for the optimal resource allocation plan in the storage apparatus 300 having a large number of logical volumes (LU).

It should be noted that in the above description, there has been described an example in which the maximum IOPS is used as the evaluation value, but the data migration amount may be used instead as the evaluation value. In this case, in Step S59, the exit condition that (difference of evaluation values|?threshold th2 may be used. Alternatively, both the maximum IOPS and the data migration amount may be used as the evaluation values.

FIG. 17 is a flow chart illustrating an example of the processing of evaluating the resource allocation plans, which is performed in Step S56 of FIG. 15 and Step S63 of FIG. 16.

In Step S71, the management computer 100 calculates the maximum IOPS of the whole ports (hereinafter, referred to as "port layer") of the generated resource allocation plans. The maximum IOPS of the port layer is expressed as:

$$\text{(Maximum IOPS of port layer)} = \Sigma(\text{IOPS of ports}). \quad [\text{Math.9}]$$

The IOPS of each of the ports is computed from the following equation:

(IOPS of port)=IF(total required bandwidth of *LUs* using the port)?port bandwidth)THEN(total required IOPS of *LUs* using the port)ELSE((total required IOPS of *LUs* using the port)*(required bandwidth)/(port bandwidth)).

It should be noted that the total required bandwidth of the logical volumes (LU) using the port is a sum of the port bandwidths 515 of the same port #514 illustrated in FIGS. 11 and 24. Similarly, the total required IOPS of the logical volumes (LU) using the port is a sum of the values of the required IOPS 522 using the same port 514 illustrated in FIGS. 11 and 24. The required bandwidth is the total required bandwidth of the logical volumes (LU). The port bandwidth is a bandwidth unique to the port #514 of FIGS. 11 and 24.

In Step S72, the management computer 100 calculates the maximum IOPS of the whole processors (hereinafter, referred to as "processor layer") of the generated resource allocation plans. The maximum IOPS of the processor layer is computed from the following equation:

(Maximum IOPS of processor layer)=Σ(IOPS of processors). [Math.10]

The IOPS of each of the processors is computed from the following equation:

(IOPS of processor)=IF((total required clock cycle of LUs using the processor)?(clock cycle of the processor))THEN(total required IOPS of LUs using the processor)ELSE((total required IOPS of LUs using the processor)*(required clock cycle)/(clock cycle of the processor)).

It should be noted that the total required clock cycle of the logical volumes (LU) using the processor is a sum of the processor clock cycles 517 of the same processor #516 illustrated in FIGS. 11 and 24. The clock cycle of the processor indicates the maximum clock cycle unique to the processor #516. The required clock cycle is the total required clock cycle of the logical volumes (LU).

In Step S73, the management computer 100 calculates the maximum IOPS of the whole RAID groups to which a logical volume (LU) can be placed (hereinafter, referred to as "RAID group layer") of the generated resource allocation plans. The maximum IOPS of the RAID group layer is computed from the following equation:

(Maximum IOPS of RAID group layer)=Σ(IOPS of RAID groups). [Math.11]

The IOPS of each of the RAID groups is computed from the following equation:

(IOPS of RAID group)=MIN(total required IOPS of LUs on the RAID group, maximum IOPS of the RAID group).

Specifically, the total required IOPS is a sum of the values of the required IOPS 522 of the logical volumes (LU) on the same RAID group #/pool #520 illustrated in FIGS. 11 and 24. The maximum IOPS of the RAID group is the maximum IOPS unique to the RAID group of the same RAID group #/pool #520 illustrated in FIGS. 11 and 24.

In Step S74, the management computer 100 calculates the maximum IOPS of the whole pools (hereinafter, referred to as "pool layer") of the generated resource allocation plans. The maximum IOPS of the pool layer is computed from the following equation:

(Maximum IOPS of pool layer)=Σ(IOPS of pools). [Math.12]

The IOPS of each of the pools is computed from the following equation:

(IOPS of pool)=MIN(total required IOPS of LUs on the pool, maximum IOPS of the pool).

Specifically, the total required IOPS is a sum of the values of the required IOPS 522 of the logical volumes (LU) on the pool of the same RAID group #/pool #520 illustrated in FIGS. 11 and 24. The maximum IOPS of the pools is the maximum IOPS unique to the pool of the same RAID group #/pool #520 illustrated in FIGS. 11 and 24.

In Step S75, the management computer 100 calculates an unused capacity Mf of each cache k of the generated resource allocation plans. The unused capacity Mf[k] of each cache k is expressed as:

Mf[k]=(capacity of cache k)-Σ(value of "cache capacity 519" of tenant using cache k). [Math.13]

In Step S76, the management computer 100 calculates the unused capacity Df[m] of the RAID group m to which a logical volume (LU) can be placed of the generated resource allocation plans as follows:

Df[m]=(capacity of RAID group m)-Σ(value of "used capacity 521" of tenant using RAID group m). [Math.14]

In Step S77, the management computer 100 calculates the unused capacity Ef[n] of each pool n of the generated resource allocation plans as follows:

Ef[n]=(capacity of pool n)-Σ(value of "used capacity 521" of tenant using pool n). [Math.15]

In Step S78, the management computer 100 calculates a data migration amount between the storage apparatus 300 (or between the logical volumes (LU)) of the generated resource allocation plans.

(Data migration amount)=Σ(capacities of LUs that are different in RAID group or pool from the current allocation) [Math.16]

The data migration amount is a sum of the logical volumes (LU) that are different in the RAID group #/pool # between the placement of the logical volumes (LU) of FIG. 11 and one of the copied tables 510A-1 to 510A-N (510A-i-1 to 510A-i-N), which is the current resource allocation plan. In other words, the data migration amount is a sum of the capacities of the logical volumes (LU) that require data migration in the transition from the placement of the logical volumes (LU) of FIG. 11 to the copied table 510A-x.

In Step S79, the management computer 100 calculates the maximum IOPS of the current resource allocation plan.

(Maximum IOPS)=MIN(maximum IOPS of port layer, maximum IOPS of processor layer, maximum IOPS of RAID group layer, maximum IOPS of pool layer)

In other words, the minimum value of the values of the maximum IOPS obtained in Steps S71 to S74 is set as the maximum IOPS of the current resource allocation plan.

Next, in Step S80, it is determined whether each of the unused capacities Mf[k], Df[m], and Ef[n] is equal to or larger than 0. When all the unused capacities are equal to or larger than 0, the processing proceeds to Step S82, in which processing of checking a transfer bandwidth is performed. When, on the other hand, any one of the unused capacities is smaller than 0, the processing proceeds to Step S81, which means that the current resource allocation plan is unfeasible and in which the maximum IOPS=0 is set as the evaluation value. Also, the data migration amount is set to infinity.

Figure 18:
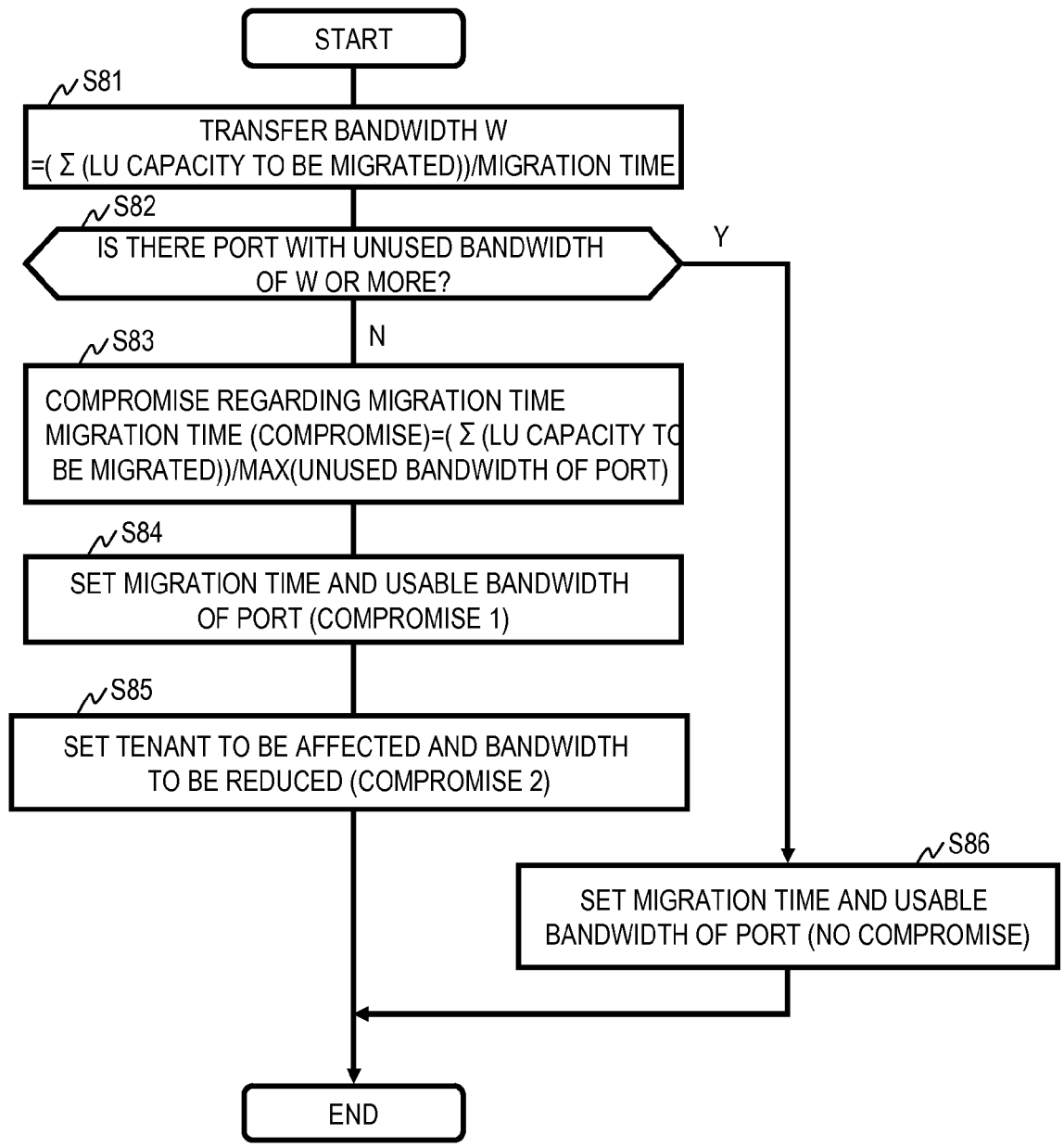
FIG. 18 shows an embodiment of this invention, and is a flow chart showing an example of the processing of checking the transfer bandwidth, which is performed in Step S82 of FIG. 17.

FIG. 18 is a flow chart illustrating an example of the processing of checking the transfer bandwidth, which is performed in Step S82 of FIG. 17.

In Step S81, the management computer 100 calculates a transfer bandwidth W used to migrate data between the storage apparatus 300 for the current resource allocation plan from the following equation:

Transfer bandwidth W=Σ(capacity of logical volume (LU) to be migrated)/migration time. [Math.17]

It should be noted that, the migration time is a time period until the time limit set by the SLA for LU 5100 of FIG. 12. For example, the difference between the scheduled migration start time and the time limit may be set as the migration time. The scheduled migration start time may be set by the manager, or may be a value obtained by adding a predetermined time period to the current time.

In Step S82, the management computer 100 determines whether or not there is a port with an unused bandwidth that is equal to or more than the transfer bandwidth W. The processing proceeds to Step S86 when there is a port having an unused bandwidth that is equal to or more than the transfer bandwidth W, or to Step S83 otherwise. It should be noted that the port to be used is a port of the interface 301 or 302.

In Step S86, the migration time, the port to be used for the data migration, and a usable bandwidth are set, and the processing ends.

On the other hand, in Step S83 and the subsequent steps, there is no port having the unused bandwidth needed for transport, and hence the management computer 100 generates compromised plans.

In Step S83, a compromised plan with feasible migration time is computed from the following equation:

$$\text{Migration time (compromise)} = (\Sigma(\text{capacity of logical volume }(LU)\text{ to be migrated}))/\text{MAX}(\text{unused bandwidth of the port}). \quad [\text{Math.18}]$$

In this equation, MAX (unused bandwidth of the port) is the maximum bandwidth that can be provided by the available port.

In Step S84, the migration time (compromise) computed in Step S83 and the usable bandwidth of the port are set as a first compromised plan. The usable bandwidth of the port is expressed as:

$$(\text{Usable bandwidth of port}) = \text{MAX}(\text{unused bandwidth of the port}).$$

In the first compromised plan, the migration time is increased in migrating data of the logical volumes (LU) to be late for the time limit defined in the SLA for LU 5100, but the data migration does not affect other tenants.

In Step S85, in order to use the original value of the migration time and comply with the time limit defined in the SLA for LU 5100, the management computer 100 generates a second compromised plan that affects other tenants.

The management computer 100 sets the usable bandwidth of the port as W, and tenants using the port as the affected tenants. It should be noted that the port with the largest unused bandwidth of the storage apparatus 300, to which the logical volume (LU) to be migrated belongs, is selected as the port. The management computer 100 calculates an affected amount from the following equation.

$$\text{Affected amount}(W-(\text{unused bandwidth of the port}))/ (\text{number of tenants using the port})$$

The affected amount is a bandwidth to be reduced from the bandwidth used by the affected tenants. Then, the management computer 100 sets the affected tenants and the bandwidth to be reduced as the second compromised plan.

With the processing described above, when the transfer bandwidth W cannot be secured, the management computer 100 may generate the first compromised plan, which increases the migration time, and the second compromised plan, which reduces the bandwidths of other tenants to comply with the time limit, and output the generated plans as allocation plans for the existing volumes.

Figure 19:
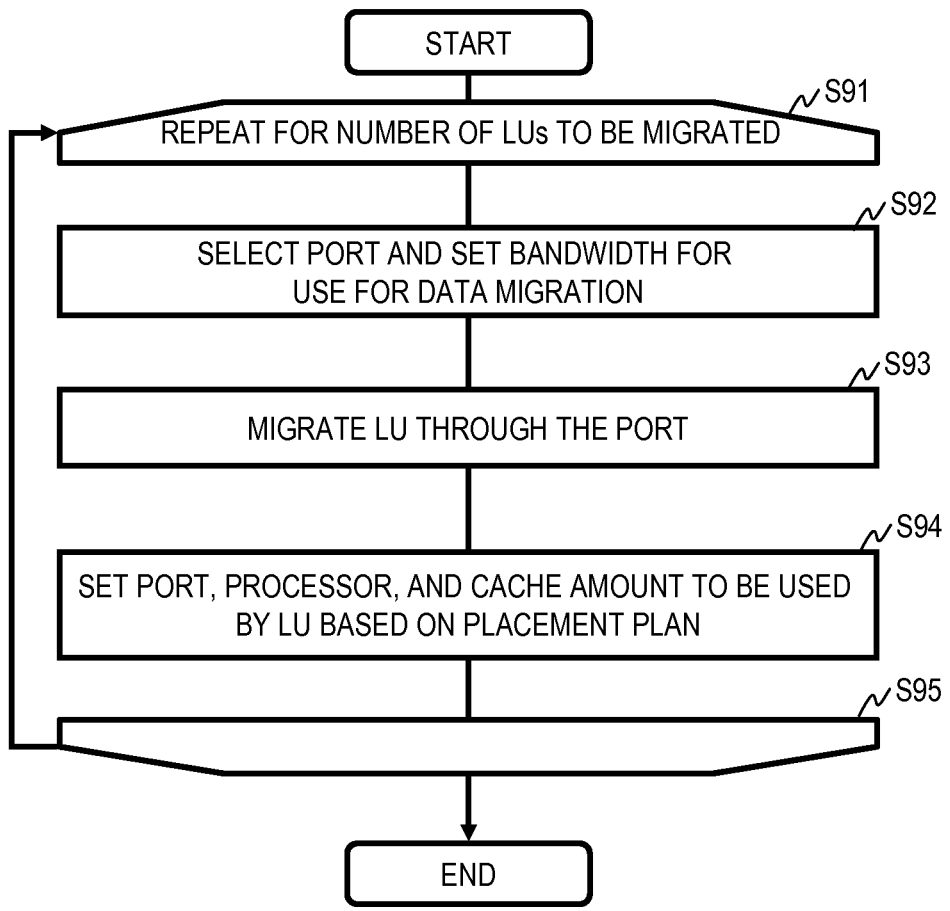
FIG. 19 shows an embodiment of this invention, and is a flow chart showing an example of the processing of executing the changing of the resources, which is performed in Step S7 of FIG. 12.

FIG. 19 is a flow chart illustrating an example of the processing of executing the changing of the resources, which is performed in Step S7 of FIG. 12.

In Steps S91 to S95, the management computer 100 repeats the processing for the number of logical volumes (LU) to be migrated. In Step S92, the management computer 100 sets the port of the storage apparatus 300 and the bandwidth for use for the data migration. This setting is made by using the value set in any one of Steps S86, S84, and S85 of FIG. 18. It should be noted that, when a compromised plan is used, the manager operating the management computer 100 selects one of the first compromised plan and the second compromised plan and inputs the selected plan to the management computer 100 in the processing of Step S6 of FIG. 12.

Next, in Step S93, the management computer 100 issues a command to migrate the specified logical volumes (LU) to the storage apparatus 300 as the migration destination through the port set in Step S92.

In Step S94, when the migration of the logical volumes (LU) is complete, the management computer 100 sets the port, the processor 320, and the disk cache 330 of the storage apparatus 300 as the migration destination in accordance with the allocation plan set in the processing of Step S6 of FIG. 12.

With the processing described above, a resource may be allocated to the new tenant without affecting other tenants. Further, in migrating the resources that existing tenants use, when the new resource cannot be allocated to the new tenant by the specified time limit, the management computer 100 may present the compromised plan which delays the time limit, and the compromised plan which complies with the time limit even if other tenants are affected. The manager using the management computer 100 may select one of the compromised plans presented by the management computer 100, to thereby perform the changing of the resources and the task of allocating a new resource to the new tenant quite easily.

FIGS. 20 to 23 illustrate examples of the tenant management table 510 obtained as a result of executing the processing of FIGS. 12 to 19.

Figure 20:
FIG. 20 shows an embodiment of this invention, and is a diagram showing an example of a tenant management table, in which a tenant F is newly added to one storage apparatus.

FIG. 20 illustrates an example in which a tenant F is newly added to one storage apparatus (SG2) 300-2 and a resource is newly allocated to the tenant F.

FIG. 21 illustrates an example in which resources straddling two storage apparatus 300 are allocated to a new tenant G. A resource of the storage apparatus (SG1) 300-1 and a resource of the storage apparatus (SG2) 300-2 are allocated to the tenant G.

FIG. 22 illustrates the tenant management table 510 after migrating a resource of the existing tenant C from the storage apparatus (SG1) 300-1 to the storage apparatus (SG2) 300-2 to secure a resource of the storage apparatus (SG1) 300-1, and then adding a resource of the storage apparatus (SG1) 300-1 to a new tenant H.

FIG. 23 illustrates an example in which, in migrating the resource of the tenant C to the storage apparatus (SG2) 300-2 and allocating the resource of the storage apparatus (SG1) 300-1 to the new tenant H as in the example of FIG. 22, the manager accepts the second compromised plan to suppress the bandwidth of the port #2 of the tenant D.

It should be noted that, in the embodiment described above, there has been described an example in which the SLA is fixed, but the SLA may vary depending on the time of the day. In this case, in generating the allocation plan, the variation of the SLA may be considered for each time of the day until the specified time limit.

Further, in the embodiment described above, the allocation plan in which, in the migration between the logical volumes (LU), the logical volumes (LU) are migrated between the storage apparatus 300, but the migration between the logical volumes (LU) may be performed within the storage apparatus 300, such as between the RAID groups or between the pools.

In this case, the allocation plan may be generated with the transfer bandwidth between the logical volumes (LU) instead of the port bandwidth.

The invention claimed is:

1. A multi-client storage system comprising a management computer including a processor and a memory, for allocating resources of a plurality of storage apparatus to a plurality of clients, the management computer comprising:
   a receiving unit for receiving conditions for providing a service to a client to which a new resource is to be allocated;
   a determining unit for determining whether the new recourse is securable under the received conditions for providing the service to the client without changing resources allocated to existing clients and conditions for providing a service of the allocated resource to each of the existing clients; and
   an allocation unit for securing, when it is determined that the new resource is securable under the received conditions for providing the service to the client, the new resource under the received conditions for providing the service to the client in the plurality of storage apparatus and allocating the new resource to the client, and
   a changing unit for performing change of the resources allocated to the existing clients,
   wherein the determining unit is configured to:
   determine, when it is determined that the new resource is not securable under the received conditions for providing the service to the client without changing the resources allocated to the existing clients and the conditions for providing the service of the allocated resource to each of the existing clients, whether or not the new resource is securable under the received conditions with the changing of the resources allocated to the existing clients; and
   issue, when it is determined that the new resource is securable under the received conditions for providing the service to the client with the changing of the resources allocated to the existing clients, a command to the changing unit to perform the changing of the resources,
   wherein the changing unit refers to:
   the resources allocated to the existing clients and the conditions for providing the service of the allocated resource to each of the existing clients, and to the conditions for providing the service to the client to which the new resource is to be allocated, which are received by the receiving unit, to generate an allocation plan for the resources allocated to the existing clients, and
   the resources allocated to the existing clients and the conditions for providing the service to the allocated resource to each of the existing clients, and to the conditions for providing the service to the client to which the new resource is to be allocated, which are received by the receiving unit, to generate a plurality of the allocation plans for the resources allocated to the existing clients and select an allocation plan that satisfies predetermined conditions from among the plurality of the allocation plans; and
   wherein the changing unit is configured to:
   recombine allocations of the resources based on the selected allocation plan that satisfies the predetermined conditions to generate a plurality of new allocation plans;
   obtain a first evaluation value regarding a performance of storage apparatus for each of the generated plurality of new allocation plans;
   select an allocation plan for which the first evaluation value is the highest from among the plurality of new allocation plans;
   further recombine allocations of the resources to generate a plurality of new allocation plans;
   obtain a second evaluation value regarding a performance of storage apparatus for each of the generated plurality of new allocation plans;
   select a allocation plan for which the second evaluation value is highest from among the plurality of new allocation plans; and
   repeat the recombination of the allocations of the resources until a difference between the evaluation values of the allocation plan for which the first evaluation value is highest and the allocation plan for which the second evaluation value is highest converges,
   wherein the receiving unit, the determining unit, the allocation unit, the changing unit are executed by a processor.

2. The multi-client storage system according to claim 1, wherein the predetermined conditions are that a data migration amount is smallest in the changing of the resources and that effects on the conditions for providing the service of the allocated resource to each of the existing clients are smallest.

3. The multi-client storage system according to claim 1, wherein the changing unit generates a new allocation plan based on the selected allocation plan that satisfies the predetermined conditions.

4. The multi-client storage system according to claim 1, wherein the changing unit obtains an evaluation value regarding a performance of storage apparatus for each of the generated plurality of the allocation plans and selects an allocation plan for which the evaluation value is highest.

5. The multi-client storage system according to claim 4, wherein the changing unit calculates maximum IOPS of each of the plurality of the allocation plans as an evaluation value and sets an allocation plan for which the maximum IOPS meets the predetermined conditions and a data migration amount is smallest in the changing of the resources.

6. The multi-client storage system according to claim 1,
   wherein the conditions for providing a service to a client to which a new resource is to be allocated, which are to be received by the receiving unit, include a time limit for allocating the new resource, and
   wherein the changing unit is configured to:
   refer to the resources allocated to the existing clients and the conditions for providing a service of the allocated resource to each of the existing clients, and to the conditions for providing the service to the client to which the new resource is to be allocated, which are received by the receiving unit, to generate an allocation plan for the resources allocated to the existing clients; and
   when the allocation plan does not satisfy one of the time limit and the conditions for providing the service of the allocated resource to each of the existing clients, generate one of a first compromised plan for delaying the time limit and a second compromised plan for constraining the resources for the existing clients.

* * * * *